United States Patent
Swanson et al.

(10) Patent No.: US 11,578,922 B2
(45) Date of Patent: Feb. 14, 2023

(54) MANAGING CONDENSATION WITH FLUID CONTROL FILM APPARATUS

(71) Applicant: 3M INNOVATIVE PROPERTIES COMPANY, St. Paul, MN (US)

(72) Inventors: Steven P. Swanson, Blaine, MN (US); Kurt J. Halverson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 310 days.

(21) Appl. No.: 16/957,624

(22) PCT Filed: Dec. 21, 2018

(86) PCT No.: PCT/US2018/066994
§ 371 (c)(1),
(2) Date: Jun. 24, 2020

(87) PCT Pub. No.: WO2019/133458
PCT Pub. Date: Jul. 4, 2019

(65) Prior Publication Data
US 2021/0055055 A1 Feb. 25, 2021

Related U.S. Application Data

(60) Provisional application No. 62/690,431, filed on Jun. 27, 2018, provisional application No. 62/611,592, filed on Dec. 29, 2017.

(51) Int. Cl.
*F28B 9/10* (2006.01)
*F25D 21/14* (2006.01)
(Continued)

(52) U.S. Cl.
CPC .............. *F28B 9/08* (2013.01); *B08B 17/065* (2013.01)

(58) Field of Classification Search
CPC . F28B 9/10; F25D 21/14; F25D 21/04; B01D 5/0003; B01D 5/009
See application file for complete search history.

(56) References Cited

U.S. PATENT DOCUMENTS 2,252,242 A * 8/1941 Wood ..................... B01D 45/08
55/440
2,981,640 A 4/1961 Hill
(Continued)

FOREIGN PATENT DOCUMENTS

WO WO 2015-164632 10/2015
WO WO 2018-009289 1/2018
(Continued)

OTHER PUBLICATIONS

"SDI introduces Riva Star silver diamine fluoride desensitizer", Apr. 23, 2018, Dentistry IQ, [retrieved from the internet on Aug. 21, 2020], URL: <https://www.dentistryiq.com/products/restorative-products/article/16367834/sdi-introduces-riva-star-silver-diamine-fluoride-desensitizer>, 6 pages.
(Continued)

*Primary Examiner* — Deming Wan
(74) *Attorney, Agent, or Firm* — Qiang Han

(57) ABSTRACT

A condensation management apparatus comprises a microstructured film arranged to condense water vapor on an underside of a substantially horizontal surface. The film comprises channels disposed at least on a first major surface and configured to support capillary movement of condensate. The channels have a channel axis substantially parallel with a longitudinal axis of the film. A capillary siphon structure of the film comprises a fold in the film, a condensate collection region proximate the fold, and a siphon region between the fold and a condensate release location of the film. At least a portion of a second major surface is attached to the underside of the substantially horizontal
(Continued)

surface such that longitudinal openings of the channels of the condensate collection region are oriented towards a direction of gravity and the condensate release location is positioned lower along the direction of gravity than the condensate collection region.

18 Claims, 16 Drawing Sheets

(51) Int. Cl.
  *F25D 21/04* (2006.01)
  *B01D 5/00* (2006.01)
  *G09B 23/30* (2006.01)
  *F28B 9/08* (2006.01)
  *B08B 17/06* (2006.01)

(56) References Cited

U.S. PATENT DOCUMENTS

| | | | |
|---|---|---|---|
| 3,567,823 | A | 3/1971 | Yamaga |
| 5,514,120 | A | 5/1996 | Johnston |
| 5,585,186 | A | 12/1996 | Scholz |
| 5,707,563 | A * | 1/1998 | Monkelbaan ......... B01D 3/225 261/113 |
| 5,728,446 | A | 3/1998 | Johnston |
| 6,372,323 | B1 | 4/2002 | Kobe |
| 6,372,954 | B1 | 4/2002 | Johnston |
| 6,375,871 | B1 | 4/2002 | Bensten |
| 6,381,846 | B2 | 5/2002 | Insley |
| 6,420,622 | B1 | 7/2002 | Johnston |
| 6,461,161 | B1 | 10/2002 | Ngo |
| 6,531,206 | B2 | 3/2003 | Johnston |
| 6,746,567 | B2 | 6/2004 | Johnston |
| 6,803,090 | B2 | 10/2004 | Castiglione |
| 6,907,921 | B2 | 6/2005 | Insley |
| 6,923,990 | B2 | 8/2005 | Capelli |
| 7,308,803 | B2 | 12/2007 | Brokaw |
| 8,968,709 | B2 | 3/2015 | Yang |
| 2003/0104169 | A1 | 6/2003 | Johnston et al. |
| 2003/0104170 | A1 * | 6/2003 | Johnston ........... E04F 15/02161 428/167 |
| 2003/0211291 | A1 | 11/2003 | Castiglione |
| 2005/0106360 | A1 | 5/2005 | Johnston |
| 2007/0139451 | A1 | 6/2007 | Somasiri |
| 2009/0242048 | A1 | 10/2009 | Sherman |
| 2010/0247456 | A1 | 9/2010 | Niederman |
| 2010/0318072 | A1 | 12/2010 | Johnston |
| 2011/0209424 | A1 | 9/2011 | Longo |
| 2012/0085063 | A1 | 4/2012 | Pufahl |
| 2013/0155723 | A1 * | 6/2013 | Coleman ................ G02B 6/009 362/621 |
| 2017/0045284 | A1 | 2/2017 | Mueler |
| 2017/0045285 | A1 | 2/2017 | Halverson |

FOREIGN PATENT DOCUMENTS

| | | |
|---|---|---|
| WO | WO 2019-155358 | 8/2019 |
| WO | WO 2020-021495 | 1/2020 |

OTHER PUBLICATIONS

"Condensation Mitigation", Quality Assurance and Food Safety Magazine, Nov./Dec. 2016, 5 pages, http://www.qualityassurancemag.com/article/cleaning-sanitation-condensation-mitigation/.

Craig, "New USA SDF Market Entry", The Silver Bulletin, Aug. 1, 2018, vol. 4, pp. 1-3.

Garg, "Potassium Iodide Reversal of Silver Diamine Fluoride Staining: A Case Report", Operative Dentistry May/Jun. 2019, vol. 44, No. 3, pp. 221-226.

Koizumi, "Effect of a silver diamine fluoride and potassium iodide-based desensitizing and cavity cleaning agent on bond strength to dentine", International Journal of Adhesions & Adhesives, Jul. 2016, vol. 68, pp. 54-61.

Nguyen, "Potassium Iodide. The Solution to Silver Diamine Fluoride Discoloration?", Advances in Dentistry & Oral Health, Jun. 2017, vol. 5, No. 1, pp. 1-6.

Zhao, "Effect of Silver Diamine Fluoride and Potassium Iodide Treatment on Secondary Caries Prevention and Tooth Discolouration in Cervical Glass Ionomer Cement Restoration", International Journal of Molecular Sciences, Feb. 6, 2017, vol. 18, No. 2, pp. 340(1)-340(11).

International Search Report for PCT International Application No. PCT/US2018/066994, dated Feb. 27, 2019, 2 pages.

Extended European Search Report, EP18896462.1, dated Aug. 27, 2021.

* cited by examiner

MANAGING CONDENSATION WITH FLUID CONTROL FILM APPARATUS

TECHNICAL FIELD

This application relates generally to fluid control films and methods for managing condensation.

BACKGROUND

Water condensation can be problematic in the operation of manufacturing and processing plants. Approximately 70 percent of food production in the United States passes through or is dependent on a cold chain, where food product or ingredients are refrigerated or frozen using a refrigeration system. A conveyor system is typically used to transport product into and out of the refrigeration system. Cooled surfaces near the entrance and exit of the refrigeration system produce condensation, which can drip onto the product if not properly managed. This condensation poses both a food quality and food safety risk. Persistent moisture can lead to the proliferation of microorganisms. The presence of microorganisms in product can decrease shelf life or cause foodborne illness. Excess moisture in certain dry products, for example bread, creates a quality issue where condensate droplets contact the product. For these reasons, it is desirable to prevent condensation formed above the entrance and exit of a refrigeration system from contacting product transported by a conveyor system.

Current mitigation solutions include manual and mechanical interventions to prevent condensation that is continuously formed above the entrance and exit of a refrigeration system from contacting product on the conveyor system. Manual approaches entail monitoring condensation build-up above the entrance and exit and periodically removing accumulated condensation by wiping or drying the surface. Because of the risk of releasing condensation during wiping or drying, production must be stopped while this procedure is being performed, leading to a loss in productivity.

An example of a current mechanical solution involves installation of air curtains above the entrance and exit of a refrigeration system. The air curtains are designed to minimize mixing of room air with internal air of the cooled chamber. Air curtains incur additional expense and expertise to both install and operate. The high velocity of air required may also disturb or alter product moving through the air curtain. A simpler mechanical intervention involves installation of a sliding panel at the front of the opening to minimize the area of the gap where air exchange occurs. The panel height is adjusted to be slightly above the height of the incoming product. While this can reduce the volume of air mixing at the opening, cold air contacts the back side of the sliding panel causing condensation to form on both the front and back sides and in the niches formed where the sliding panel is affixed. These niches are difficult to access and require frequent disassembly to ensure adequate cleaning and sanitation of the surfaces.

SUMMARY

Embodiments are directed to a condensation management apparatus comprising a microstructured film arranged to condense water vapor on an underside of a substantially horizontal surface. The microstructured film comprises channels disposed at least on a first major surface of the film and configured to support capillary movement of condensate. The channels have a channel axis substantially parallel with a longitudinal axis of the film. A capillary siphon structure of the film comprises a fold in the film, a condensate collection region proximate the fold, and a siphon region between the fold and a condensate release location of the film. At least a portion of a second major surface of the film is attached to the underside of the substantially horizontal surface such that longitudinal openings of the channels of the condensate collection region are oriented towards a direction of gravity and the condensate release location is positioned lower along the direction of gravity than the condensate collection region to support siphon action of the capillary siphon structure.

Embodiments are directed to a condensation management apparatus comprising a microstructured film arranged to condense water vapor on an underside of a substantially horizontal surface. The microstructured film comprises channels disposed at least on a first major surface of the film and configured to support capillary movement of condensate. The channels have a channel axis substantially parallel with a longitudinal axis of the film. The film comprises a plurality of capillary siphon structures comprising a first fold in the film, a second fold in the film, a condensate collection region between the first and second folds, a first siphon region between the first fold and a first condensate release location of the film, and a second siphon region between the second fold and a second condensate release location of the film. At least a portion of a second major surface of the film is attached to the underside of the substantially horizontal surface such that longitudinal openings of the channels of the condensate collection region are oriented towards a direction of gravity and the first and second condensate release locations are positioned lower along the direction of gravity than the condensate collection region to support siphon action of the capillary siphon structures.

Embodiments are directed to a method comprising collecting, in a condensate collection region of a microstructured film comprising capillary channels, condensate produced on an underside of a substantially horizontal surface. The method also comprises siphoning the condensate from the collection region across a first fold in the film and through a first siphon region of the film to a first condensate release location of the film. The method further comprises releasing the condensate from the film at the first condensate release location of the film.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments discussed herein involve a condensation management apparatus comprising a fluid control film arrangement that transports condensate along microcapillary channels away from underlying sensitive locations to a designated release location. In some embodiments, a condensation management apparatus comprising a fluid control film arrangement manages condensation produced on a vertical component by transporting condensate laterally along microcapillary channels to a designated release location at an end of the film arrangement. In other embodiments, a condensation management apparatus comprising a fluid control film arrangement manages condensation produced on the underside of a horizontal component by transporting condensate laterally along microcapillary channels to a designated release location at an end of the film arrangement.

Figure 1A:
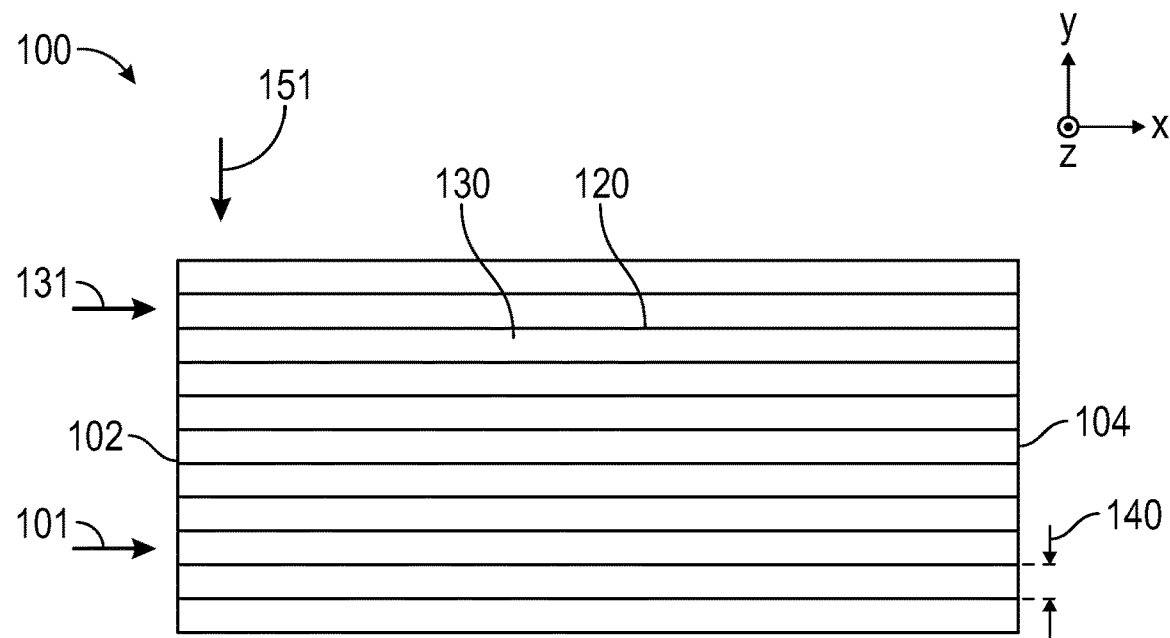
FIG. 1A illustrates a plan view of a fluid control film according to an example embodiment.

FIG. 1A illustrates an elongated fluid control film with flow channels (microchannels) that are parallel with respect to a longitudinal axis of the fluid control film, the x-axis in FIG. 1A. Fluid control film 100 includes an array of channels 130 that extend across a length of the film 100. The channels 130 have a channel longitudinal axis 131 that is parallel with a longitudinal axis 101 of the film 100. Ridges 120 rise above the surface of the film 100 along the z-axis to form the channels 130, with each channel 130 having a ridge 120 on either side running along the channel longitudinal axis 131. In some embodiments, each set of adjacent ridges 120 are equally spaced apart. In other embodiments, the spacing of the adjacent ridges 120 may be at least two different distances apart.

The channels 130 are configured to provide capillary movement of fluid in the channels 130 and across the film 100. The capillary action wicks the fluid to disperse it across the film 100 so as to increase the surface to volume ratio of the fluid and enable more rapid transport of the fluid. The channels 130 have openings 140 at opposing first and second edges 102 and 104 of the film 100. The openings 140 provide fluid release locations of the film 100. Fluid that collects within the channels 130 can be wicked to the first and second edges 102 and 104 and released from the film 100 at the openings 140. In some embodiments, the film 100 can be oriented so that fluid that collects within the channels 130 is predominately released from the film 100 by openings 140 at either the first edge 102 or the second edge 104.

Figure 1B:
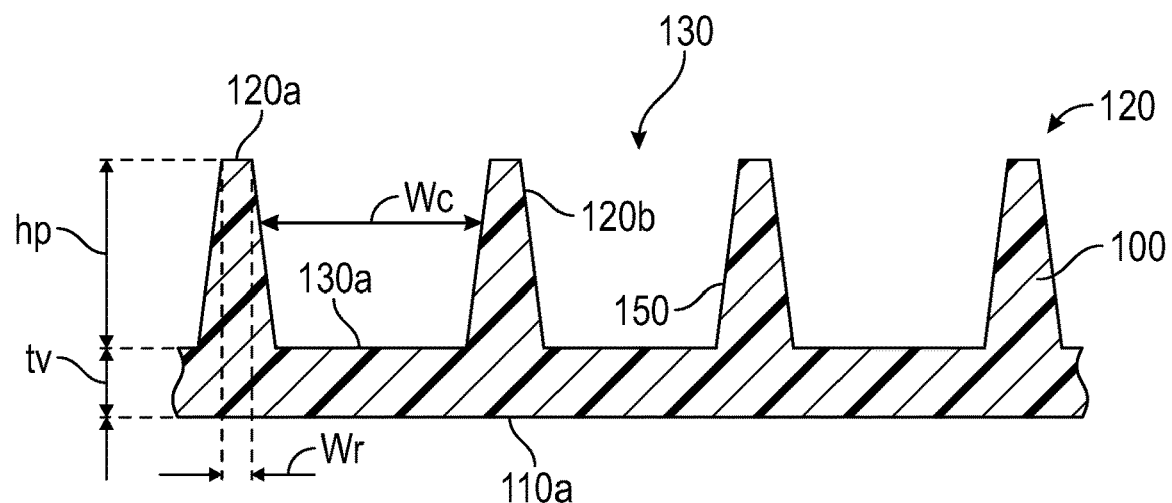
FIG. 1B illustrates a cross section of a fluid control film according to an example embodiment.

FIG. 1B illustrates a cross section of the film 100. The channels 130 of the film 100 are defined by first and second ridges 120 disposed on either side of the channel 130. As shown in FIG. 1B, the ridges 120 can extend along the z-axis, generally normal to a bottom surface 130a of the channel 130. Alternatively, in some embodiments, the ridges 120 can extend at a non-perpendicular angle with respect to the bottom surface 130a of the channel 130. The first and second primary ridges 120 have a height $h_p$ that is measured from the bottom surface 130a of the channel 130 to a top surface 120a of the ridges 120. The ridge height $h_p$ may be selected to provide durability and protection to the film 100. In some embodiments, the ridge height $h_p$ is about 25 μm to about 500 μm, the cross sectional channel width, $w_c$, is about 25 μm to about 500 and the cross sectional ridge width, $w_r$, is about 30 μm to about 250 μm.

In some embodiments, as shown in FIG. 1B, the side surfaces 120b of the channels 130 may be sloped in cross section so that the width of the ridge 120 at the bottom surface 130a of the channel 130 is greater than the width of the ridge 120 at the top surface 120a of the ridges 120. In this scenario, the width of the channel 130 at the bottom surface 130a of the channel 130 is less than the width of the channel 130 at the top surface 120a of the ridges 120. Alternatively, the side surfaces of the channels 130 can be sloped so that the channel width at the bottom surface 130a of the channel 130 is greater than the channel width at the top surface 120a of the ridges 120.

The film 100 has a thickness G measured from a bottom surface 110a of the film 100 to the bottom surface 130a of the channel 130. The thickness $t_v$ can be selected to allow liquid droplets to be wicked into the film 100 but still maintain a robust structure. In some embodiments, the film thickness $t_v$ is less than about 75 μm thick, or between about 20 μm to about 200 μm. A hydrophilic coating 150 may be disposed, e.g., plasma deposited, on the microstructured surface of the film 100.

Figure 2A:
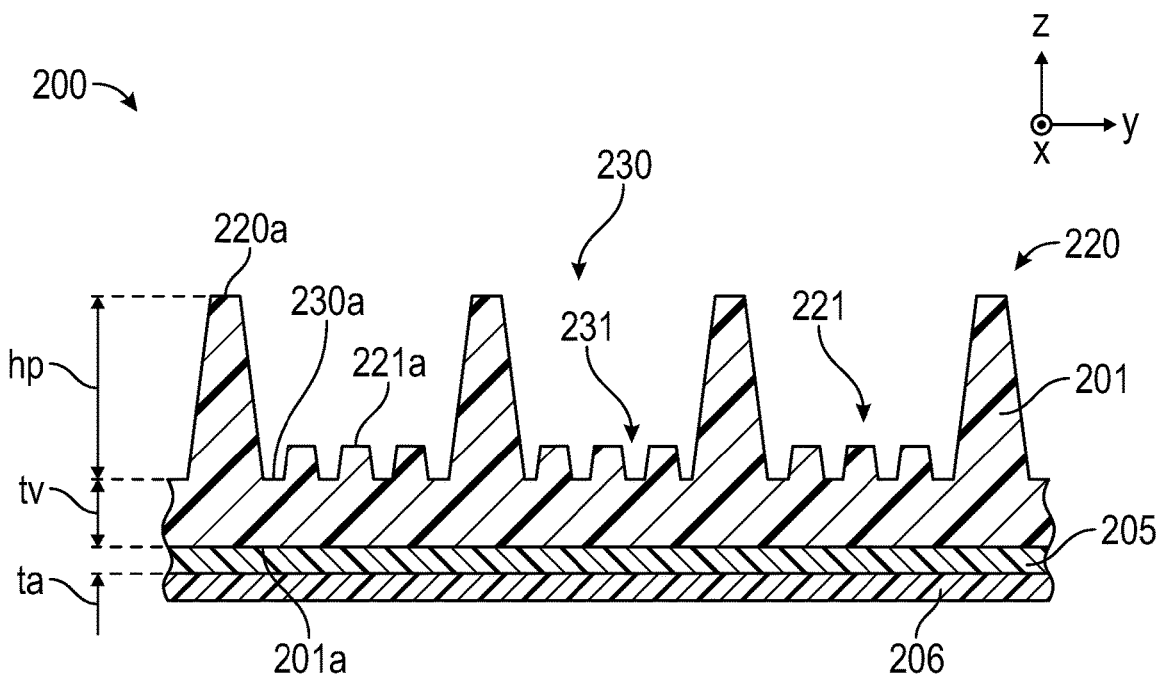
FIGS. 2A and 2B illustrate a cross section of a fluid control film with primary and secondary channels according to an example embodiment.
Figure 2B:
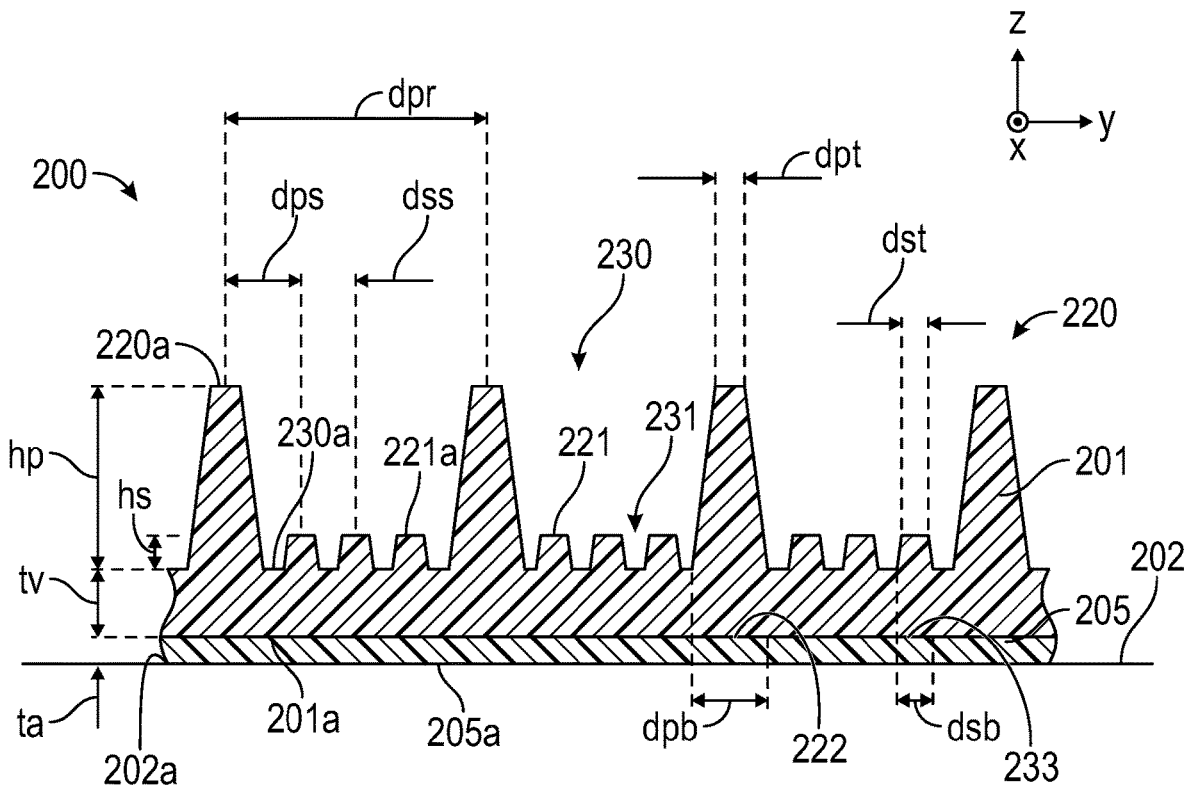

FIGS. 2A and 2B are cross sections of a fluid control device 200 according to an example embodiment. The fluid control device 200 illustrated in FIG. 2A includes a fluid control film 201, an optional insulating foam layer (not shown in FIG), an optional adhesive layer 205, and an optional release layer 206 disposed on the surface of the adhesive layer 205 opposite the film 201. The release layer 206 may be included to protect the adhesive layer 205 prior to the application of the adhesive layer 205 to an external surface 202. For example, the external surface 202 may be an external surface of a component of a system that condenses water vapor. FIG. 2B shows the fluid control device 200 installed on the external surface 202 with the release layer 206 removed.

The fluid control device 200 comprises a fluid control film 201 having primary and secondary channels 230, 231 defined by primary and secondary ridges 220, 221, wherein the channels 230, 231 and ridges 220, 221 run along a longitudinal axis of the film 201, e.g., the x-axis as previously discussed in connection with FIG. 1A. Each primary channel 230 is defined by a set of primary ridges 220 (first and second) on either side of the primary channel 230. The primary ridges 220 have a height $h_p$ that is measured from a bottom surface 230a of the channel 230 to the top surface 220a of the ridges 220.

In some embodiments, microstructures are disposed within the primary channels 230. In some embodiments, the microstructures comprise secondary channels 231 disposed between the first and secondary primary ridges 220 of the primary channels 230. Each of the secondary channels 231 is associated with at least one secondary ridge 221. The secondary channels 231 may be located between a set of secondary ridges 221 or between a secondary ridge 221 and a primary ridge 220.

The center-to-center distance between the primary ridges 220, $d_{pr}$, may be in a range of about 25 μm to about 500 μm; the center-to-center distance between a primary ridge 220 and the closest secondary ridge 221, $d_{ps}$, may be in a range of about 5 μm to about 350 μm; the center-to-center distance between two secondary ridges 221, $d_{ss}$, may be in a range of about 5 μm to about 350 μm. In some cases, the primary ridges 220 and/or secondary ridges 221 may taper with distance from their bases 222, 233. The distance between external surfaces of a primary ridge 220 at the base 222, $d_{pb}$, may be in a range of about 15 μm to about 250 μm and may taper to a smaller distance of $d_{pt}$ in a range of about 1 μm to about 25 μm. The distance between external surfaces of a secondary ridge 221 at the base 233, $d_{sb}$, may be in a range of about 15 μm to about 250 μm and may taper to a smaller distance of $d_{st}$ in a range of about 1 μm to about 25 μm. In one example, $d_{pp}$=0.00898 inches, $d_{ps}$=0.00264 inches, $d_{ss}$=0.00185 inches, $d_{pb}$=0.00251 inches, $d_{pt}$=0.00100 inches, $d_{sb}$=0.00131 inches, $d_{st}$=0.00100 inches, $h_{p}$=0.00784 inches, and $h_s$=0.00160 inches.

The secondary ridges 221 have height $h_s$ that is measured from the bottom surface 230a of the channel 230 to a top surface 221a of the secondary ridges 221. The height $h_p$ of the primary ridges 220 may be greater than the height $h_s$ of the secondary ridges 221. In some embodiments, the height $h_p$ of the primary ridges is between about 25 μm to about 500 μm and the height of the secondary ridges $h_s$ is between about 5 μm to about 350 μm. In some embodiments, a ratio of the secondary ridge 221 height $h_s$ to the primary ridge 220 height $h_p$ is about 1:5. The primary ridges 220 can be designed to provide durability to the film 200 as well as protection to the secondary channels 231, secondary ridges 221 and/or or other microstructures disposed between the primary ridges 220.

The fluid control device 200 may also have an adhesive layer 205 disposed on the bottom surface 201a of the fluid control film 201. The adhesive layer 205 may allow the fluid control film 200 to be attached to an external surface 202 to help manage liquid dispersion across the external surface. The adhesive layer 205 has a thickness $t_a$ and the film 201 has a thickness $t_v$ from the bottom surface 230a of the channels 230, 231 to the bottom surface 201a of the film 201. In some embodiments, the total thickness between the bottom surface 230a of the channels 230, 231 and the bottom surface 205a of the adhesive layer 205, $t_v$+$t_a$ can be less than about 300 μm, e.g., about 225 μm. The combination of the adhesive layer 205 and the film 201 forms a fluid control tape. The adhesive layer 205 may be continuous or discontinuous. The fluid control device 200 may also include a foam that provides an added degree of thermal insulation to minimize any frost that may form on the tape. The tape 200 may be made with a variety of additives that, for example, make the tape suitable for wicking various liquids including neutral, acidic, basic and/or oily materials. The tape 200 is configured to disperse fluid across the surface of the film 201 to facilitate transport of the fluid to end openings of the film 201.

Figure 2C:
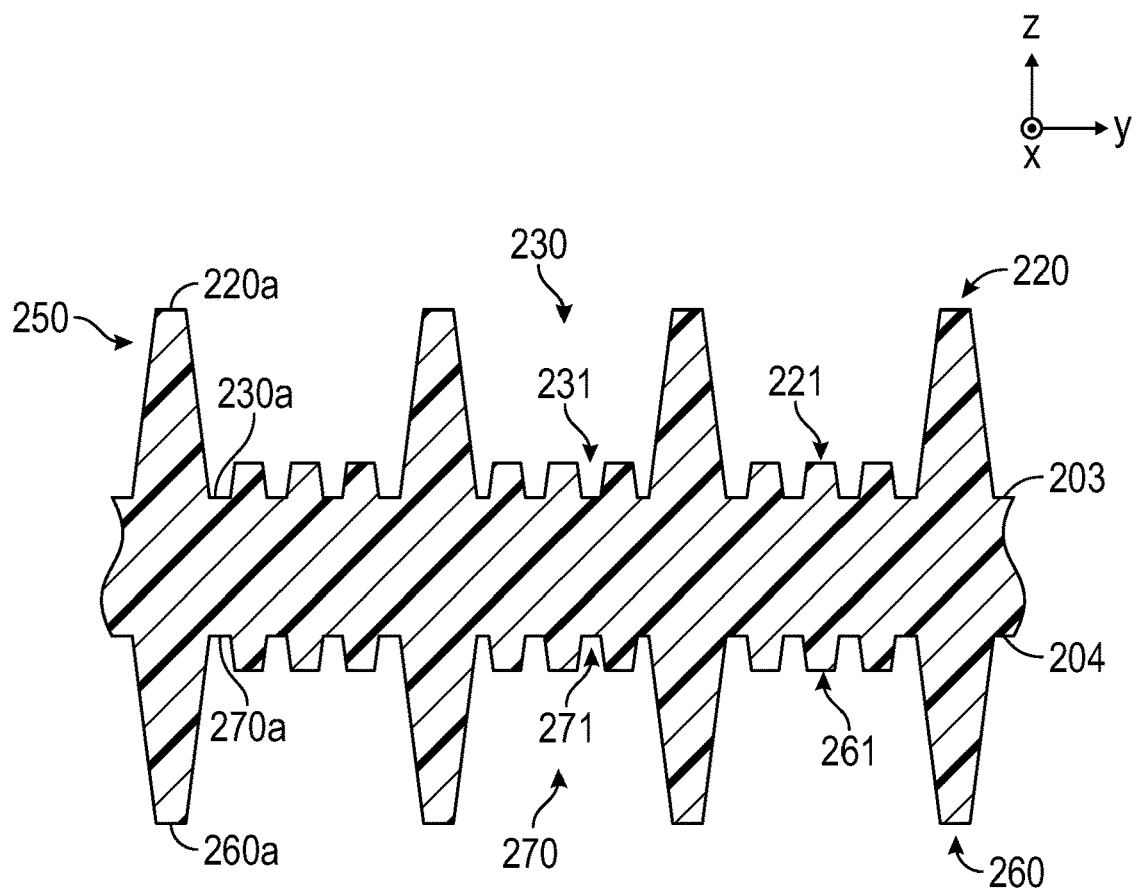
FIG. 2C illustrates a cross section of a fluid control film with primary and secondary channels disposed on opposing major surfaces of the fluid control film according to an example embodiment.

FIG. 2C illustrates a cross-section of a fluid control film with primary and secondary channels disposed on opposing major surfaces of the fluid control film according to an example embodiment. The fluid control film 250 illustrated in FIG. 2C includes a first major surface 203 and an opposing second major surface 204. The first major surface 203 includes primary and secondary channels 230, 231 defined by primary and secondary ridges 220, 221, wherein the channels 230, 231 and ridges 220, 221 run along a longitudinal axis of the film 250, e.g., the x-axis as previously discussed in connection with FIG. 1A. Each primary channel 230 is defined by a set of primary ridges 220 (first and second) on either side of the primary channel 230. The primary ridges 220 have a height $h_p$ that is measured from a bottom surface 230a of the channel 230 to the top surface 220a of the ridges 220.

In some embodiments, microstructures are disposed within the primary channels 230. In some embodiments, the microstructures comprise secondary channels 231 disposed between the first and secondary primary ridges 220 of the primary channels 230. Each of the secondary channels 231 is associated with at least one secondary ridge 221. The secondary channels 231 may be located between a set of secondary ridges 221 or between a secondary ridge 221 and a primary ridge 220.

The second major surface 204 includes primary and secondary channels 270, 271 defined by primary and secondary ridges 260, 261, wherein the channels 270, 271 and ridges 260, 261 run along a longitudinal axis of the film 250, e.g., the x-axis. Each primary channel 270 is defined by a set of primary ridges 260 (first and second) on either side of the primary channel 270. The primary ridges 260 have a height $h_p$ that is measured from a bottom surface 270a of the channel 270 to the top surface 260a of the ridges 260.

In some embodiments, microstructures are disposed within the primary channels 270. In some embodiments, the microstructures comprise secondary channels 271 disposed between the first and secondary primary ridges 260 of the primary channels 270. Each of the secondary channels 271 is associated with at least one secondary ridge 261. The secondary channels 271 may be located between a set of secondary ridges 261 or between a secondary ridge 261 and a primary ridge 260. The channel features on the first and second major surfaces 203, 204 of the film 250 can have dimensions of like features shown in FIG. 2B.

Figure 3:
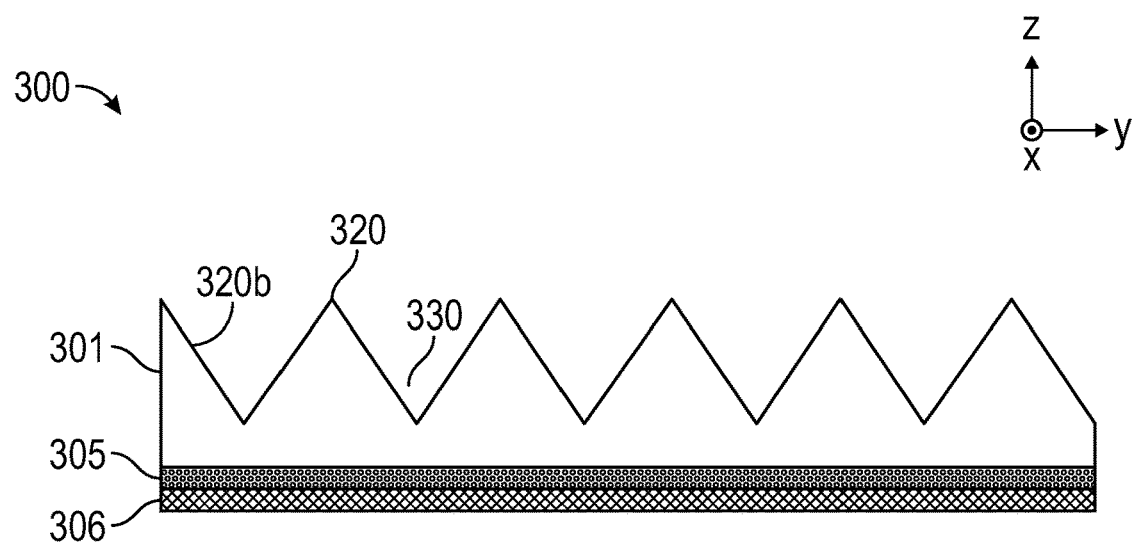
FIG. 3 illustrates a cross section of a fluid control film with ridges and channels according to an example embodiment.

FIG. 3 illustrates a cross section of a fluid control device 300 with ridges and channels according to an example embodiment. A fluid control film 301 includes channels 330 that are v-shaped with ridges 320 that define the channels 330. In this embodiment, the side surfaces 320b of the channels 330 are disposed at an angle with respect to the axis normal to the layer surface, i.e., the z axis in FIG. 3. As previously discussed, the channels 330 and ridges 320 of the film 301 run along a channel longitudinal axis that is parallel to the longitudinal axis of the film 301, e.g., the x-axis as previously discussed in connection with FIG. 1A. The ridges 320 may be an equal distance apart from one another. The film 301 may have an adhesive layer 305 disposed on the bottom surface of fluid control film 301. As previously discuss in connection with FIG. 2A, fluid control device 300 may also include a release layer 306 disposed on the adhesive layer 305.

The microchannels described herein may be replicated in a predetermined pattern that form a series of individual open capillary channels that extend along a major surface of the fluid control film. These microreplicated channels formed in sheets or films are generally uniform and regular along substantially each channel length, for example from channel to channel. The film or sheet may be thin, flexible, cost effective to produce, can be formed to possess desired material properties for its intended application and can have, if desired, a layer of insulating foam, or an attachment means (such as adhesive) on one side thereof to permit ready application to a variety of surfaces in use.

The fluid control films discussed herein are capable of spontaneously transporting fluids along the channels by capillary action. Two general factors that influence the ability of fluid control films to spontaneously transport fluids are (i) the geometry or topography of the surface (capillarity, size and shape of the channels) and (ii) the nature of the film surface (e.g., surface energy). To achieve the desired amount of fluid transport capability, the designer may adjust the structure or topography of the fluid control film and/or adjust the surface energy of the fluid control film surface. In order for a channel to function for fluid transport by spontaneous wicking by capillary action, the channel is generally sufficiently hydrophilic to allow the fluid to wet the surfaces of the channel with a contact angle between the fluid and the surface of the fluid control film equal to or less than 90 degrees.

In some implementations, the fluid control films described herein can be prepared using an extrusion embossing process that allows continuous and/or roll-to-roll film fabrication. According to one suitable process, a flowable material is continuously brought into line contact with a molding surface of a molding tool. The molding tool includes an embossing pattern cut into the surface of the tool, the embossing pattern being the microchannel pattern of the fluid control film in negative relief. A plurality of microchannels is formed in the flowable material by the molding tool. The flowable material is solidified to form an elongated fluid control film that has a length along a longitudinal axis and a width, the length being greater than the width. The microchannels can be formed along a channel longitudinal axis that is parallel to the longitudinal axis of the film.

The flowable material may be extruded from a die directly onto the surface of the molding tool such that flowable material is brought into line contact with the surface of molding tool. The flowable material may comprise, for example, various photocurable, thermally curable, and thermoplastic resin compositions. The line contact is defined by the upstream edge of the resin and moves relative to both molding tool and the flowable material as molding tool rotates. The resulting fluid control film may be a single layer article that can be taken up on a roll to yield the article in the form of a roll good. In some implementations, the fabrication process can further include treatment of the surface of the fluid control film that bears the microchannels, such as plasma deposition of a hydrophilic coating as disclosed herein. In some implementations, the molding tool may be a roll or belt and forms a nip along with an opposing roller. The nip between the molding tool and opposing roller assists in forcing the flowable material into the molding pattern. The spacing of the gap forming the nip can be adjusted to assist in the formation of a predetermined thickness of the fluid control film. Additional information about suitable fabrication processes for the disclosed fluid control films are described in commonly owned U.S. Pat. Nos. 6,375,871 and 6,372,323, each of which is incorporated by reference herein in its respective entirety.

The fluid control films discussed herein can be formed from any polymeric materials suitable for casting or embossing including, for example, polyolefins, polyesters, polyamides, poly(vinyl chloride), polyether esters, polyimides, polyesteramide, polyacrylates, polyvinylacetate, hydrolyzed derivatives of polyvinylacetate, etc. Specific embodiments use polyolefins, particularly polyethylene or polypropylene, blends and/or copolymers thereof, and copolymers of propylene and/or ethylene with minor proportions of other monomers, such as vinyl acetate or acrylates such as methyl and butylacrylate. Polyolefins readily replicate the surface of a casting or embossing roll. They are tough, durable and hold their shape well, thus making such films easy to handle after the casting or embossing process. Hydrophilic polyurethanes have physical properties and inherently high surface energy. Alternatively, fluid control films can be cast from thermosets (curable resin materials) such as polyurethanes, acrylates, epoxies and silicones, and cured by exposure radiation (e.g., thermal, UV or E-beam radiation, etc.) or moisture. These materials may contain various additives including surface energy modifiers (such as surfactants and hydrophilic polymers), plasticizers, antioxidants, pigments, release agents, antistatic agents and the like. Suitable fluid control films also can be manufactured using pressure sensitive adhesive materials. In some cases, the channels may be formed using inorganic materials (e.g., glass, ceramics, or metals). Generally, the fluid control film substantially retains its geometry and surface characteristics upon exposure to fluids.

In some embodiments, the fluid control film may include a layer of insulating foam. Examples of foam include open or closed cell foam composed from polyurethane, polyethylene, vinyl, silicone or other foams known to those skilled in the art.

In some embodiments, the fluid control film may include a characteristic altering additive or surface coating. Examples of additives include flame retardants, hydrophobics, hydrophylics, antimicrobial agents, inorganics, corrosion inhibitors, metallic particles, glass fibers, fillers, clays and nanoparticles.

The surface of the film may be modified to ensure sufficient capillary forces. For example, the surface may be modified to ensure it is sufficiently hydrophilic. The films generally may be modified (e.g., by surface treatment, application of surface coatings or agents), or incorporation of selected agents, such that the film surface is rendered hydrophilic so as to exhibit a contact angle of 90° or less with aqueous fluids. Any suitable known method may be utilized to achieve a hydrophilic surface on fluid control films of the present disclosure. Surface treatments may be employed such as topical application of a surfactant, plasma treatment, vacuum deposition, polymerization of hydrophilic monomers, grafting hydrophilic moieties onto the film surface, corona or flame treatment, etc. Alternatively, a surfactant or other suitable agent may be blended with the resin as an internal characteristic altering additive at the time of film extrusion. Typically, a surfactant is incorporated in the polymeric composition from which the fluid control film is made rather than rely upon topical application of a surfactant coating, since topically applied coatings may tend to fill in (i.e., blunt), the notches of the channels, thereby interfering with the desired fluid flow to which the invention is directed. When a coating is applied, it is generally thin to facilitate a uniform thin layer on the structured surface. An illustrative example of a surfactant that can be incorporated in polyethylene fluid control films is TRITON™ X-100 (available from Union Carbide Corp., Danbury, Conn.), an octylphenoxypolyethoxyethanol nonionic surfactant, e.g., used at between about 0.1 and 0.5 weight percent. Other surfactant materials that are suitable for increased durability requirements include Polystep® B22 (available from Stepan Company, Northfield, Ill.) and TRITON™ X-35 (available from Union Carbide Corp., Danbury, Conn.).

A surfactant or mixture of surfactants may be applied to the surface of the fluid control film or impregnated into the article in order to adjust the properties of the fluid control film or article. For example, it may be desired to make the surface of the fluid control film more hydrophilic than the film would be without such a component.

A surfactant such as a hydrophilic polymer or mixture of polymers may be applied to the surface of the fluid control film or impregnated into the article in order to adjust the properties of the fluid control film or article. Alternatively, a hydrophilic monomer may be added to the article and polymerized in situ to form an interpenetrating polymer network. For example, a hydrophilic acrylate and initiator could be added and polymerized by heat or actinic radiation.

Suitable hydrophilic polymers include: homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

As discussed above, a hydrophilic silane or mixture of silanes may be applied to the surface of the fluid control film or impregnated into the article in order to adjust the properties of the fluid control film or article. Suitable silanes include the anionic silanes disclosed in U.S. Pat. No. 5,585,186, as well as non-ionic or cationic hydrophilic silanes.

Additional information regarding materials suitable for microchannel fluid control films discussed herein is described in commonly owned U.S. Patent Publication 2005/0106360, which is incorporated herein by reference.

In some embodiments, a hydrophilic coating may be deposited on the surface of the fluid control film by plasma deposition, which may occur in a batch-wise process or a continuous process. As used herein, the term "plasma" means a partially ionized gaseous or fluid state of matter containing reactive species which include electrons, ions, neutral molecules, free radicals, and other excited state atoms and molecules.

In general, plasma deposition involves moving the fluid control film through a chamber filled with one or more gaseous silicon-containing compounds at a reduced pressure (relative to atmospheric pressure). Power is provided to an electrode located adjacent to, or in contact with film. This creates an electric field, which forms a silicon-rich plasma from the gaseous silicon-containing compounds.

Ionized molecules from the plasma then accelerate toward the electrode and impact the surface of the fluid control film. By virtue of this impact, the ionized molecules react with, and covalently bond to, the surface forming a hydrophilic coating. Temperatures for plasma depositing the hydrophilic coating are relatively low (e.g., about 10 degrees C.). This is beneficial because high temperatures required for alternative deposition techniques (e.g., chemical vapor deposition) are known to degrade many materials suitable for multi-layer film 12, such as polyimides.

The extent of the plasma deposition may depend on a variety of processing factors, such as the composition of the gaseous silicon-containing compounds, the presence of other gases, the exposure time of the surface of the fluid control film to the plasma, the level of power provided to the electrode, the gas flow rates, and the reaction chamber pressure. These factors correspondingly help determine a thickness of hydrophilic coating.

The hydrophilic coating may include one or more silicon-containing materials, such as silicon/oxygen materials, diamond-like glass (DLG) materials, and combinations thereof. Examples of suitable gaseous silicon-containing compounds for depositing layers of silicon/oxygen materials include silanes (e.g., $SiH_4$). Examples of suitable gaseous silicon-containing compounds for depositing layers of DLG materials include gaseous organosilicon compounds that are in a gaseous state at the reduced pressures of reaction chamber 56. Examples of suitable organosilicon compounds include trimethylsilane, triethylsilane, trimethoxysilane, triethoxysilane, tetramethylsilane, tetraethylsilane, tetramethoxysilane, tetraethoxysilane, hexamethylcyclotrisiloxane, tetramethylcyclotetrasiloxane, tetraethylcyclotetrasiloxane, octamethylcyclotetrasiloxane, hexamethyldisiloxane, bistrimethylsilylmethane, and combinations thereof. An example of a particularly suitable organosilicon compound includes tetramethylsilane.

After completing a plasma deposition process with gaseous silicon-containing compounds, gaseous non-organic compounds may continue to be used for plasma treatment to remove surface methyl groups from the deposited materials. This increases the hydrophilic properties of the resulting hydrophilic coating.

Additional information regarding materials and processes for applying a hydrophilic coating to a fluid control film as discussed in this disclosure is described in commonly owned U.S. Patent Publication 2007/0139451, which is incorporated herein by reference.

Embodiments of the disclosure are directed to a condensation management apparatus comprising one or more fluid control films that transport condensate along microcapillary channels away from underlying sensitive locations to a designated release location. A condensation management apparatus described herein can be affixed to one or more surfaces of a component that produces condensation, such as surfaces of a refrigeration system. It is understood that apparatuses described herein are not limited to managing condensation on surfaces of a refrigeration system, and can be used on surfaces of any component that produces condensation.

Figure 4:
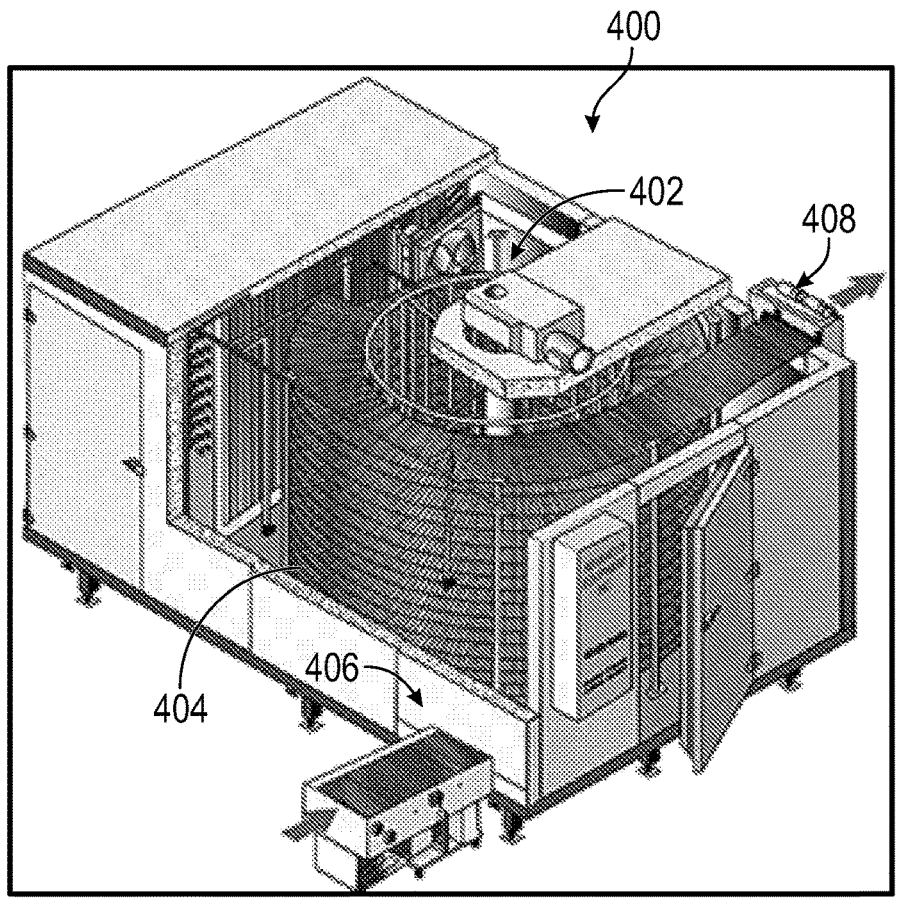
FIG. 4 illustrates a typical refrigeration system comprising a cooled chamber and a conveyor system to which a condensation management apparatus can be attached in accordance with various embodiments.

FIG. 4 illustrates a refrigeration system 400 comprising a cooled chamber 402 and a conveyor system 404. The refrigeration system 400 illustrated in FIG. 4 is referred to as a spiral freezer (available under the trade designation "IQF-SPIRAL FREEZER" from Industrial Refrigeration PVT. LTD., Mumbai, India). The cooled chamber 402 has openings at an entrance 406 and an exit 408. Product is conveyed through the cooled chamber 402 with sufficient dwell time to reach a desired temperature prior to exiting. For frozen foods, the chamber 402 is typically cooled with liquid ammonia, generating an internal temperature of approximately −20 Fahrenheit (F). Cold internal air mixes with room air at the entrance 406 and exit 408 where product enters and exits the cooled chamber 402. This mixing of cold and warm air lowers the temperature of the surfaces of the refrigeration system 400 adjacent to the entrance 406 and exit 408. Moisture present in room air contacts these cooled surfaces of the refrigeration system 400, generating frost if the surface temperature is below 32 F or condensation if the surface temperature is above 32 F. Condensation or frost formed on the vertical and horizontal external surfaces of the refrigeration system 400 above the entrance 406 and exit 408 is directly over the product on the conveyer system 404. As the condensation load increases, condensate is eventually pulled by gravity downward and released in droplet form from the vertical and horizontal external surfaces of the refrigeration system 400 above the entrance 406 and exit 408 and onto product on the conveyor system 404, posing both a food quality and food safety risk. In the case of the surface temperature less than 32 F, particles of frost will buildup and break off onto the product 404, posing both a food quality and food safety risk.

Embodiments of the disclosure address the aforementioned issues by providing a condensation management apparatus that prevents condensation formed on surfaces from contacting product by transporting condensate laterally away from the product. Some embodiments are directed to a condensation management apparatus that prevents condensation formed on vertical surfaces from contacting product by transporting condensate laterally. Other embodiments are directed to a condensation management apparatus that prevents condensation formed on the underside of horizontal surfaces from contacting product by transporting condensate laterally. Further embodiments are directed to a condensation management apparatus that prevents condensation formed on vertical surfaces and on the underside of horizontal surfaces from contacting product by transporting condensate laterally. A condensation management apparatus of the present disclosure is disposable, ensuring a hygienic surface by periodic removal and replacement.

Figure 5:
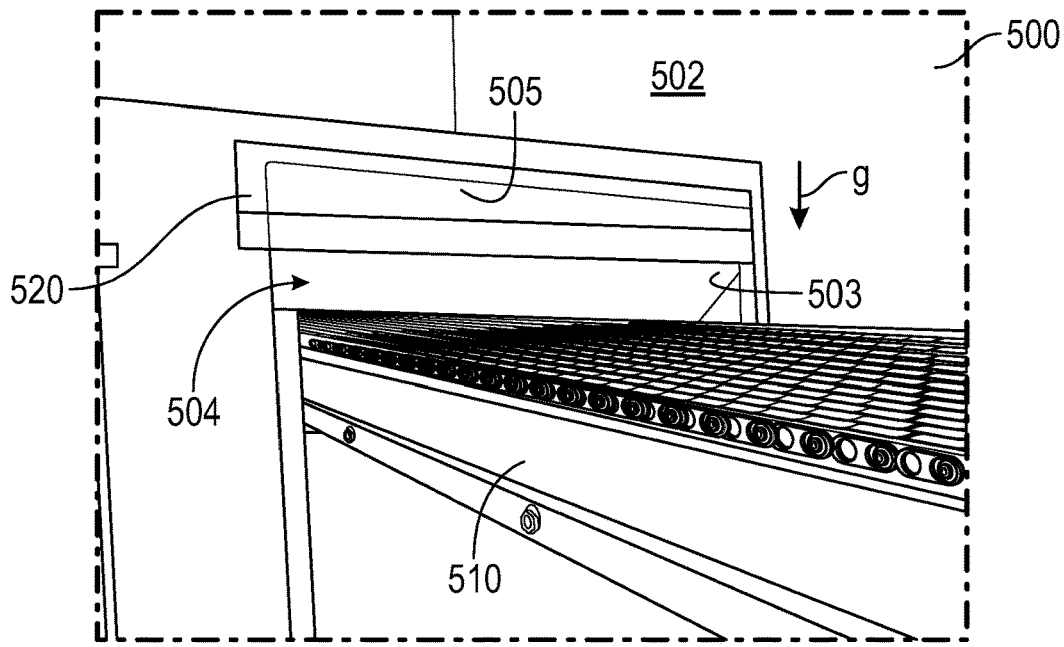
FIG. 5 illustrates a condensation management apparatus attached to a component of a refrigeration system in accordance with various embodiments.

FIG. 5 illustrates a condensation management apparatus attached to a component of a refrigeration system in accordance with various embodiments. The component of the refrigeration system 500 illustrated in FIG. 5 includes a vertical surface 502 comprising an opening 504 dimensioned to receive a conveyor system 510. The conveyor system 510 is arranged to move product (e.g., food product or ingredients) into and out of the refrigeration system 500. The opening 504 shown in FIG. 5 can be the entrance or exit of the refrigeration system 500. Surfaces of the refrigeration system 500 surrounding the opening 504, including opposing side surfaces 503 and horizontal surface 505, are referred to collectively as a freezer tunnel. Cold air internal to the refrigeration system 500 mixes with room air at the opening 504, lowering the temperature of the vertical surface 502 and the freezer tunnel surfaces 503, 505 adjacent to the opening 504. Condensation formed on the vertical and horizontal surfaces 502, 505 above the opening 504 pose a risk of being released in droplet form onto the product on the conveyor system 510.

A microstructured film arrangement 520 is attached to the vertical surface 502 and extends across a portion of the opening 504. The film arrangement 520 comprises one or more microstructured fluid control films having channels dimensioned to support capillary movement of condensate. The channels of the film arrangement 520 are arranged as shown in FIG. 1A, such that the channels have a channel longitudinal axis substantially parallel with the longitudinal axis of the film arrangement 520. The film arrangement 520 includes first and second opposing major surfaces, both of which include the channels. The film arrangement 520 is attached to the vertical surface 502 such that the channel longitudinal axis of the film arrangement 520 is tilted at a tilt angle equal to or greater than a minimum tilt angle with respect to an axis normal to a direction of gravity. With the film arrangement 520 tilted at a tilt angle equal to or greater than the minimum tilt angle, condensation formed on the major surfaces of the film arrangement 520 is transported by the channels laterally to the edge of the opening 504, away from product on the conveyor system 510. The film arrangement 520 is periodically removed from the vertical surface 502, discarded, and replaced, thereby improving hygiene relative to current practices.

Figure 6A:
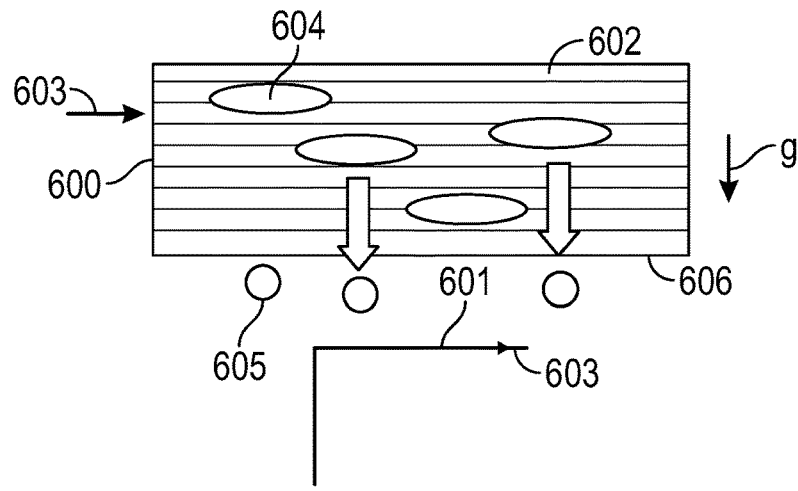
FIGS. 6A-6C illustrate the impact of the slope of a microstructured fluid control film on the transport of condensate by capillary action across the film in accordance with various embodiments.
Figure 6B:
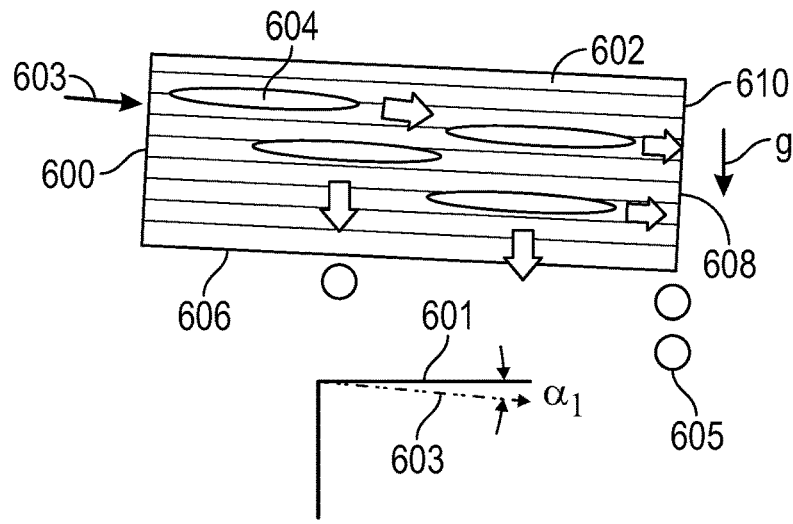
Figure 6C:
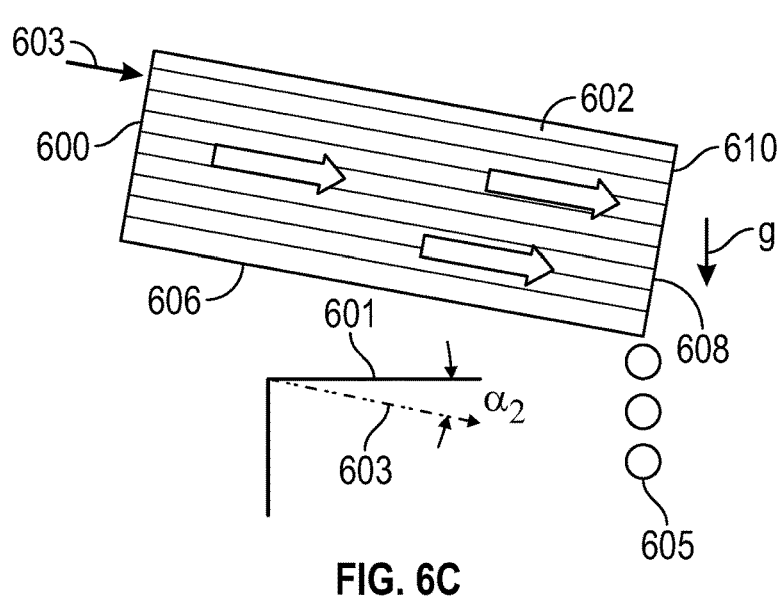

FIGS. 6A-6C illustrate the impact of slope of a microstructured fluid control film on the transport of condensate across the film. The microstructured fluid control film 600 illustrated in FIGS. 6A-6C includes channels 602 arranged as shown in FIG. 1A, such that the channels 602 have a channel longitudinal axis 603 substantially parallel with the longitudinal axis of the film 600. Condensation is formed on the surface of the film 600 until the channels are filled. Once saturated, additional condensation accumulates forming surface droplets 604. In FIG. 6A, the channel longitudinal axis 603 is parallel with respect to an axis 601 normal to a direction of gravity. In this orientation, surface droplets increase in size until the force of gravity pulls the surface droplets to the lower edge 606 of the film, resulting in the release of droplets 605. In FIG. 6B, the channel longitudinal axis 603 is tilted at a tilt angle $\alpha_1$ with respect to the axis 601 normal to the direction of gravity. The tilt angle $\alpha_1$ shown in FIG. 6B is less than the minimum tilt angle that prevents the release of droplets 605 from the lower edge 606 of the film 600. In this orientation, the force of gravity initiates fluid flow towards the channel openings 608 but is insufficient to transport all the surface droplets, resulting in the release of droplets 605 from the lower edge 606 and channel openings 608 along end edge 610 of the film 600.

In FIG. 6C, the channel longitudinal axis 603 is tilted at an angle $\alpha_2$ with respect to the axis 601 normal to the direction of gravity. The tilt angle $\alpha_2$ shown in FIG. 6C is equal to or greater than the minimum tilt angle that prevents release of droplets 605 from the lower edge 606 of the film 600. In this orientation, the force of gravity is greater than the capillary force of the channels 602, resulting in the release of droplets 605 only from the channel openings 608 along end edge 610 of the film 600. The inventors have discovered that the minimum tilt angle that prevents release of droplets 605 from the lower edge 606 of the film 600 is about 4 degrees.

Figure 7:
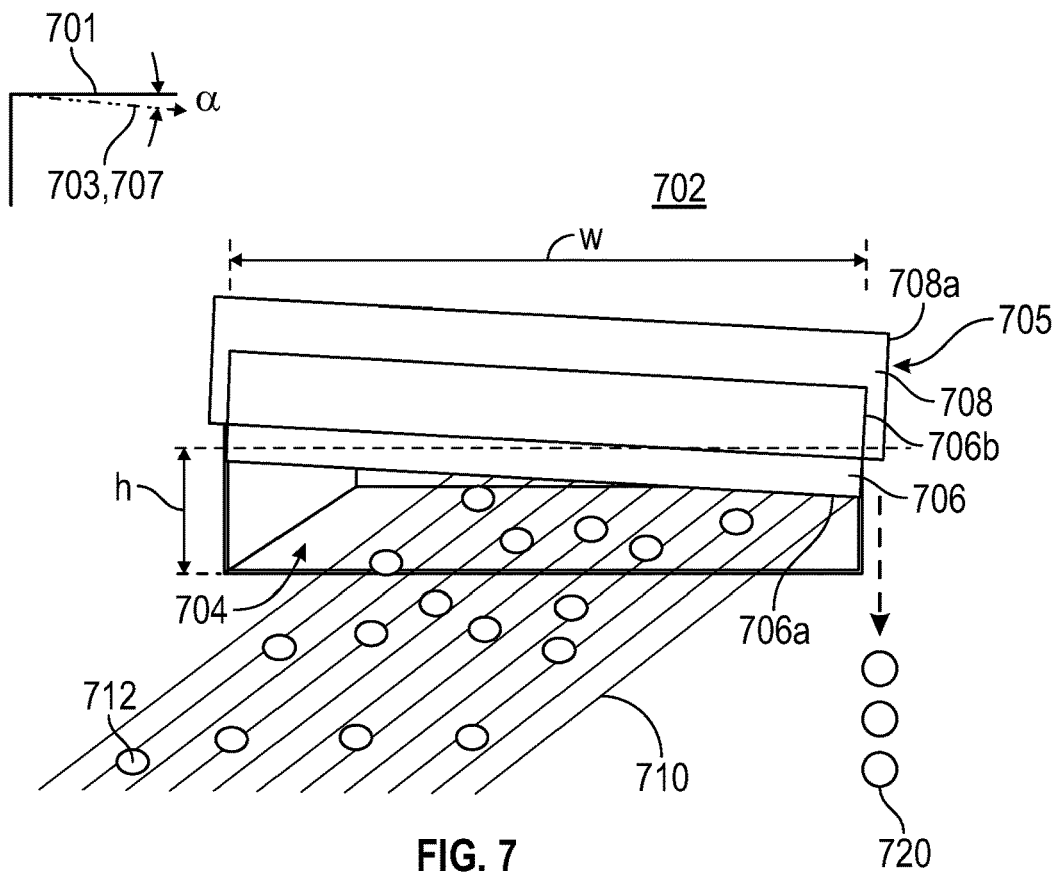
FIG. 7 illustrates a condensation management apparatus attached to a component of a refrigeration system in accordance with various embodiments.

FIG. 7 illustrates a condensation management apparatus attached to a component of a refrigeration system in accordance with various embodiments. The component of the refrigeration system illustrated in FIG. 7 includes a vertical surface 702 comprising an opening 704 dimensioned to receive a conveyor system 710. The conveyor system 710 is arranged to move product 712 (e.g., food product or ingredients) into and out of the refrigeration system. The opening 704 can be the entrance or exit of the refrigeration system. The opening 704 can have a width w and a height h equivalent to dimensions of an entrance or exit of a standard food industry freezer tunnel. For example, the opening 704 can have a width w of 2 feet and a height h of 6 inches.

A microstructured film arrangement 705 is attached to the vertical surface 702 and extends across a portion of the opening 704. In the embodiment shown in FIG. 7, the film arrangement 705 includes a first fluid control film 706 and a second fluid control film 708. The first film 706 includes channels dimensioned to support capillary movement of condensate along opposing first and second major surfaces of the first film 706. The channels of film 706 are arranged as shown in FIGS. 1A and 2C, such that the channels have a channel longitudinal axis substantially parallel with the longitudinal axis of the first film 706. The first film 706 is positioned at a slope across the opening 704 and at a desired height above the product 712. The first film 706 is positioned such that the channel longitudinal axis 703 of the first film 706 is tilted at a tilt angle $\alpha$ equal to or greater than a minimum tilt angle (e.g., ≥4 degrees) with respect to an axis 701 normal to a direction of gravity. A lower edge 706a of the first film 706 extends partially into the opening 704, with a desired separation provided between the lower edge 706a and the product 712.

The second film 708 includes channels dimensioned to support capillary movement of condensate disposed on a first major surface of the second film 708. A second major surface of the second film 708 includes an adhesive (e.g., pressure sensitive adhesive), or optionally an insulating layer of foam with an adhesive. In some embodiments, the second major surface of the second film 708 can include channels dimensioned to support capillary movement of condensate. The first film 706 is secured to the opening 704 by the second film 708. As shown, the second film 708 has a length greater than that of the first film 706. The second major surface of the second film 708 is adhered to the first major surface of the first film 706 and to the vertical surface 702 of the refrigeration system component. The second film 708 is positioned such that the channel longitudinal axis 707 of the second film 708 it is tilted at a tilt angle $\alpha$ equal to or greater than a minimum tilt angle (e.g., ≥4 degrees) with respect to an axis 701 normal to a direction of gravity.

During operation of the refrigeration system, condensation is continuously formed on the vertical surface 702 adjacent to the opening 704. Condensation formed on the first and second major surfaces of the first film 706 is transported by the channels to the edge of the opening 704, away from the product 712. If frost tends to form on the vertical surface 702 an optional layer of foam on the second film 708 will prevent frost from forming resulting in condensation forming instead. Condensate transported by the first film 706 is released as droplets 720 from channel openings along end edge 706b of the first film 706. Condensation formed on the first major surface of the second film 708 is transported by the channels to the edge of the opening 704, away from the product 712. Condensate transported by the second film 708 is released as droplets 720 from channel openings along end edge 708a of the second film 708.

Figure 8:
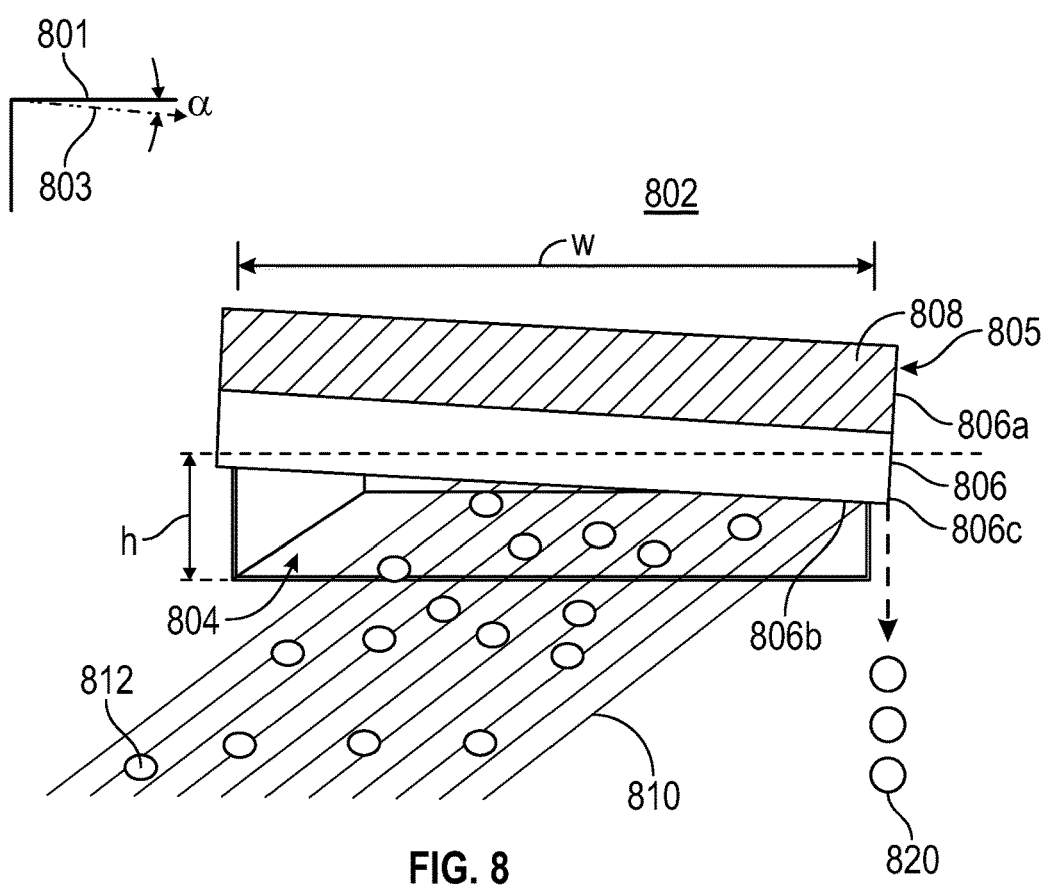
FIG. 8 illustrates a condensation management apparatus attached to a component of a refrigeration system in accordance with various embodiments.

FIG. 8 illustrates a condensation management apparatus attached to a component of a refrigeration system in accordance with various embodiments. The component of the refrigeration system illustrated in FIG. 8 includes a vertical surface 802 comprising an opening 804 dimensioned to receive a conveyor system 810. The conveyor system 810 is arranged to move product 812 (e.g., food product or ingredients) into and out of the refrigeration system. The opening 804 can be the entrance or exit of the refrigeration system. The opening 804 can have a width w and a height h equivalent to dimensions of an entrance or exit of a standard food industry freezer tunnel (e.g., width w of 2 feet and a height h of 6 inches).

A microstructured film arrangement 805 is attached to the vertical surface 802 of the refrigeration system and extends across a portion of the opening 804. In the embodiment illustrated in FIG. 8, the film arrangement 805 includes a single fluid control film 806 having opposing first and second major surface that include channels dimensioned to support capillary movement of condensate. The channels of film 806 are arranged as shown in FIG. 1A, such that the channels have a channel longitudinal axis substantially parallel with the longitudinal axis of the film 806. The film 806 can have channels arranged as shown in FIG. 2C, such that channels are disposed on the first and second major surfaces of the film 806.

The second major surface of the film 806 includes an adhesive 808 disposed on an upper region 806a of the film 806. In some embodiments, the adhesive 808 can be disposed over the channels in the upper region 806a. In other embodiments, the upper region 806a can be devoid of channels. The adhesive 808 facilitates attachment of the film 806 to the vertical surface 802 of the refrigeration system. The film 806 is positioned on and affixed to the vertical surface 802 such that the channel longitudinal axis 803 of the film 806 is tilted at a tilt angle $\alpha$ equal to or greater than a minimum tilt angle (e.g., ≥4 degrees) with respect to an axis 801 normal to a direction of gravity. A lower edge 806b of the film 806 extends partially into the opening 804, with a desired separation provided between the lower edge 806a and the product 812.

During operation of the refrigeration system, condensation is continuously formed on the vertical surface 802 adjacent to the opening 804. Condensation formed on the first and second major surfaces of the film 806 is transported by the channels to the edge of the opening 804, away from the product 812. Condensate transported by the film 806 is released as droplets 820 from channel openings along end edge 806*c* of the film 806.

Figure 9:
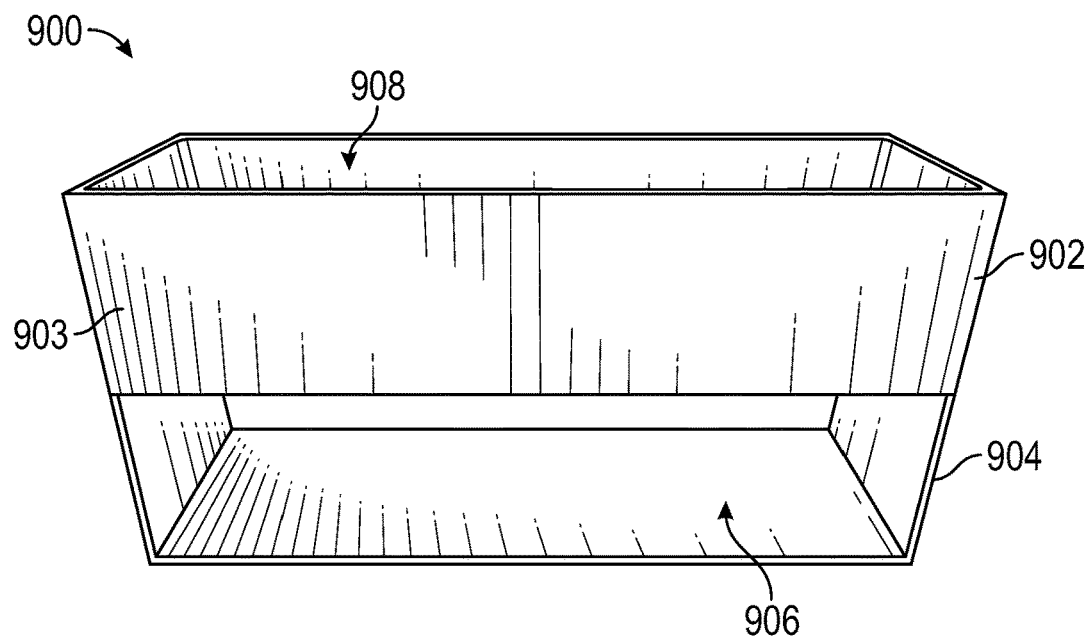
FIG. 9 illustrates a cooling apparatus that simulates the entrance or exit of a standard food industry freezer tunnel.
Figure 10:
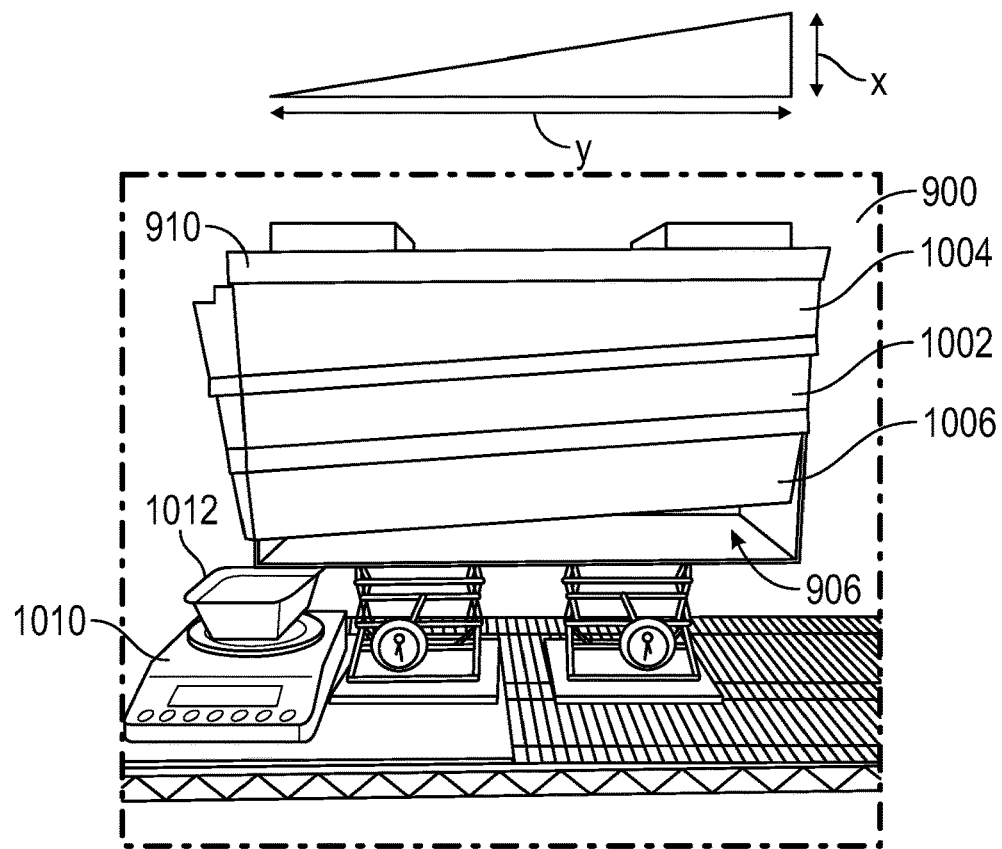
FIG. 10 illustrates a condensation management apparatus attached to the cooling apparatus illustrated in FIG. 9 in accordance with various embodiments.

Example 1—Determination of Slope Required for Lateral Fluid Transport on a Vertical Surface A cooling apparatus 900, shown in FIG. 9, was built from stainless steel. The cooling apparatus 900 included a container 902 having a length of 24 inches, a height of 6 inches, and a depth of 8 inches. The container 902 was fabricated above a support structure 904 having an opening 906. The opening 906 had a length of 24 inches, a height of 6 inches, and a depth of 8 inches. The volume 908 of the container 902 was filled with ice and covered with insulating foam 910, as shown in FIG. 10. The ice-filled container 902 generated a surface temperature of 32 F. The cooling apparatus 900 was constructed to simulate the opening (entrance or exit) of a standard food industry freezer tunnel.

Preparation of Microchannel Fluid Control Films:

Film 1002, shown in FIG. 10, was prepared to include microchannels on one side and an adhesive on the other side. Film 1002 was prepared as described hereinabove using a tool with the pattern oriented to produce microchannels running parallel to the down web film direction (see, e.g., FIG. 1A). The microchannel surface was plasma treated followed by coating the backside with an adhesive as described hereinabove (see, e.g., FIG. 2B).

Film 1004 was prepared in the same manner as film 1002.

Film 1006 was prepared to include microchannels on both sides (see, e.g., FIG. 2C). Film 1006 was prepared by first producing a film with microchannels on one side as described hereinabove. To produce film 1006 with channels on both sides, the film 1006 was wound back through the embossing station with the channels facing away from the tool. Channels were formed on the backside by repeating the extrusion embossing process against the film 1006. The microchannel surface on both sides of the film 1006 was plasma treated as previously described.

Attaching the Microchannel Fluid Control Films to the Cooling Apparatus

A 25 inch long, 4 inch wide section of film 1006 (microchannels on both sides) was positioned to extend across the front surface 903 of the container 902 and approximately 3 inches over the top of the opening 906. The right edge of film 1006 was aligned flush with the right side of the container 902. The left edge of film 1006 extended approximately 1 inch over the left side of the container 902. Film 1006 was secured in place using a 25 inch long, 4 inch wide section of film 1002 (microchannels on one side, adhesive on the other side) with approximately 1 inch of overlap. The adhesive side of film 1002 secured the film 1002 to the front surface 903 of the container 900 and to film 1006. Film 1004 (microchannels on one side, adhesive on the other side) was adhered above film 1002 with about a ¼ inch of overlap. In this manner, the entire front surface 903 of the container 902 was covered by films 1002, 1004, and 1006.

For each experiment, films 1002, 1004, 1006 were adhered to the front surface 903 of the container 902 as described above with increasing slope as shown in Table 1 below. The apparatus 900 was placed in a walk-in environmental chamber with a temperature of 75 F and relative humidity (RH) of 90%. A balance 1010 with a weighing boat 1012 was placed under the left edge of the protruding film 1006 to measure the mass of condensate collected. The experiment was monitored for formation, transport, and release of surface droplets along the bottom edge of film 1006 for a duration of 75 minutes. The rate of collection was determined as the slope of the line formed by the mass plotted as a function of time (see, e.g., the graph of FIG. 12).

TABLE 1

| X (mm) | % SLOPE (X/Y) | surface droplets formed | surface droplets released from bottom edge | surface droplets transported to low edge | rate of release from low side (g/minute) |
| --- | --- | --- | --- | --- | --- |
| 0 | 0 | yes | all | no | 0 |
| 3 | 0.5 | yes | <10 drops | yes | 0.32 |
| 7 | 1.1 | yes | <10 drops | yes | 0.33 |
| 16 | 2.6 | yes | none | yes | 0.31 |
| 25 | 4.1 | no | N/A | N/A | 0.32 |
| 34 | 5.6 | no | N/A | N/A | 0.33 |

Example 2—Determination of Transport Distance at 4.2% Slope

Figure 11:
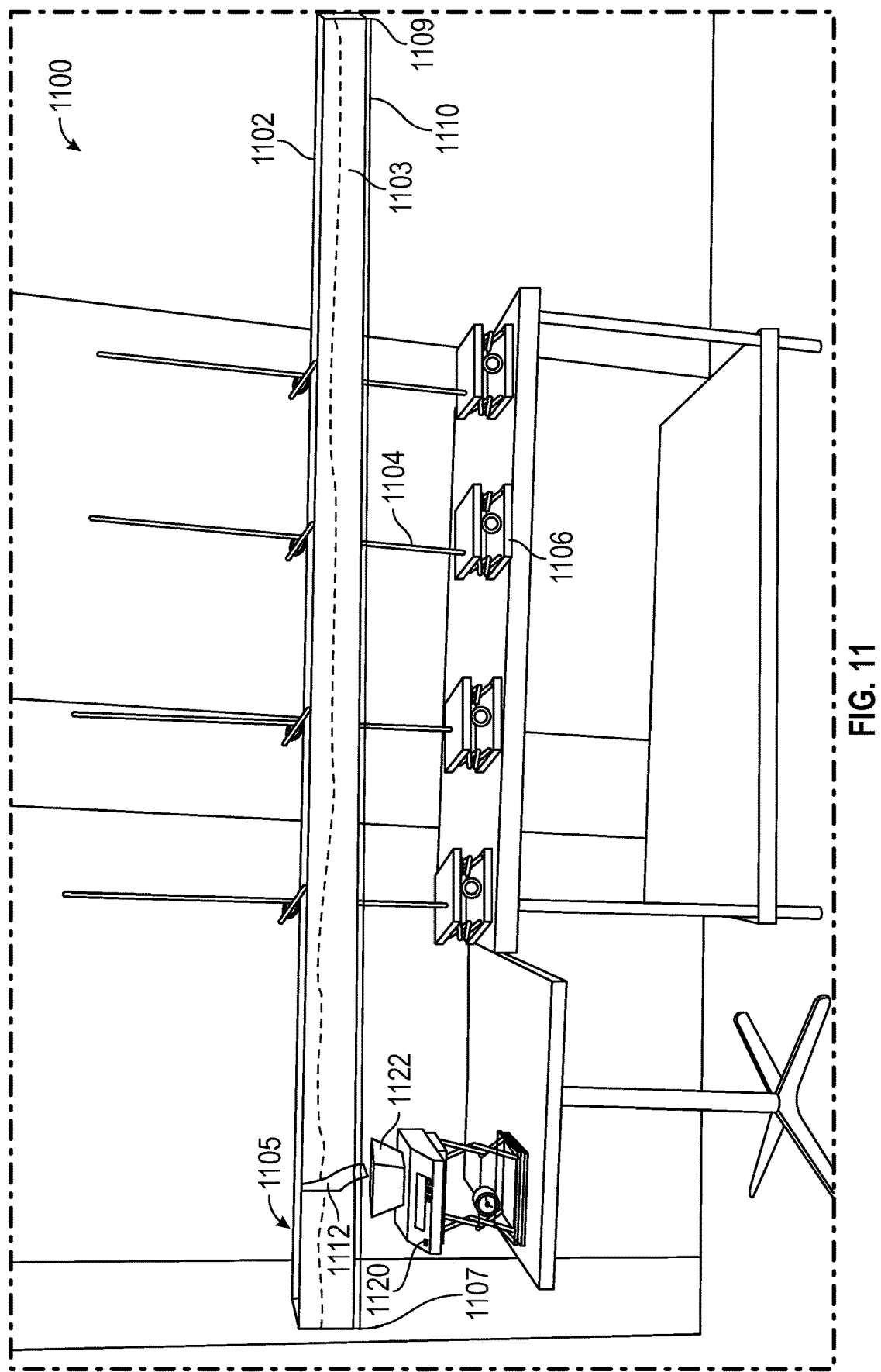
FIG. 11 illustrates a condensation management apparatus attached to an experimental cooling apparatus in accordance with various embodiments.

The apparatus 1100 illustrated in FIG. 11 was used to extend the transport distance relative to the cooling apparatus 900 described in Example 1 above. A 10 foot section of aluminum house gutter 1102 (McMaster Carr, part number 62415T44) was end capped (McMaster Carr part numbers 62415T29 and 62415T31) and sealed with RTV silicone caulk (CRC, Warminster Pa., Part number 14056) to prevent leaks. The gutter 1102 was placed in a walk-in environmental chamber. The gutter 1102 was suspended using four ring stands 1104 and laboratory jacks 1106 (Fisher Scientific, part number 563082) placed approximately 18 inches apart. A 7'-6" length of film 1110 was adhered to the front face 1103 of the gutter 1102. The film 1110 was prepared in the same manner as film 1002 in Example 1 above (microchannels on one side, adhesive on the other side).

The laboratory jacks 1006 were adjusted to achieve a 4.2% slope (5 inch drop over 10 feet). A 1 inch portion 1112 of the film 1110 near the low end 1107 of the gutter 1102 was peeled back to provide a drainage point for transported condensate. A balance 1120 with an aluminum weighing boat 1122 was placed below the drip point. The volume 1105 of the gutter 1102 was filled with ice and covered with foam insulation (not shown). The mass of condensate released at the drip point above the balance 1120 was recorded every 10 minutes. The film 1110 was monitored for formation, transport, and release of surface droplets over the course of two hours.

Figure 12:
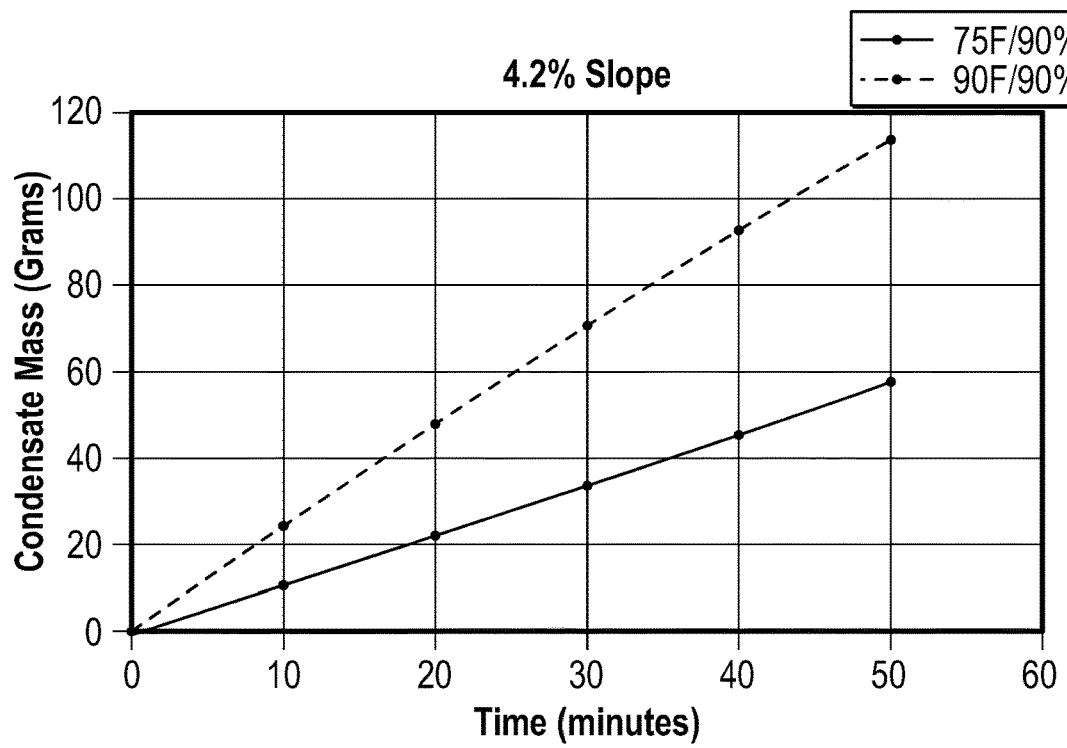
FIG. 12 is a graph of collected condensate as a function of time for an experiment conducted using the apparatus illustrated in FIG. 11.

Condensation was measured at two different conditions, 75 F at 90% RH and 90 F at 90% RH. Elongated surface droplets were observed forming approximately 24 inches from the high end 1109 of the gutter 1102 extending to the low end 1107 at approximately 15 minutes. The droplets were observed to migrate laterally from the high end 1109 to the low end 1107. The number of droplets on the film surface increased from the high end 1109 to the low end 1107. Steady-state condensation, transport, and release from the drip point was achieved under both conditions in approximately 30 minutes. The experiment was allowed to proceed for two hours. During this time, all the condensation formed on film 1110 was released at portion 1112. No surface drops were released from the bottom edge of film 1110 during the experiment. The mass of condensate was measured at steady-state beginning at 70 minutes continuing to 120 minutes as reported in Table 2 below. A graph of this data is shown in FIG. 12. It was found that, at a 4.2% slope, the film 1110 can transport approximately 100 g of condensate per hour from a 7 foot by 4 inch area without dripping along the bottom edge of the film 1110.

TABLE 2

| Time (minutes) | Condensate Mass (grams) | |
| --- | --- | --- |
| | 75 F./90% RH | 90 F./90% RH |
| 70 | 0 | 0 |
| 80 | 9.28 | 23.4 |
| 90 | 21.21 | 46.8 |
| 100 | 32.86 | 70.2 |
| 110 | 45.21 | 92.1 |
| 120 | 57.17 | 112.2 |

Figure 13:
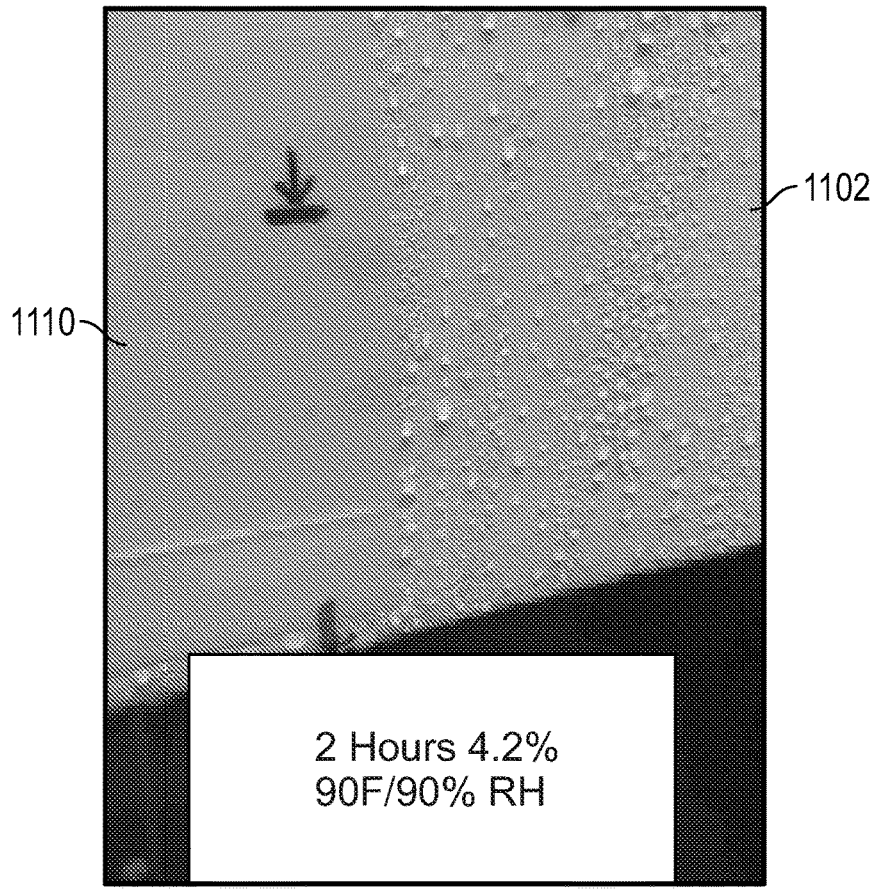
FIG. 13 is a photograph of a terminal end of the condensation management apparatus attached to the apparatus illustrated in FIG. 11.

FIG. 13 is a photograph of the terminus of the film 1110 at the high end 1109 of the gutter 1102. The photograph was taken at the two hour mark in the experiment at 90 F and 90% RH. FIG. 13 shows the absence of surface drops being released from the film 1110 relative to the abundance of surface drops formed on the face 1103 of the gutter 1102.

Figure 14:
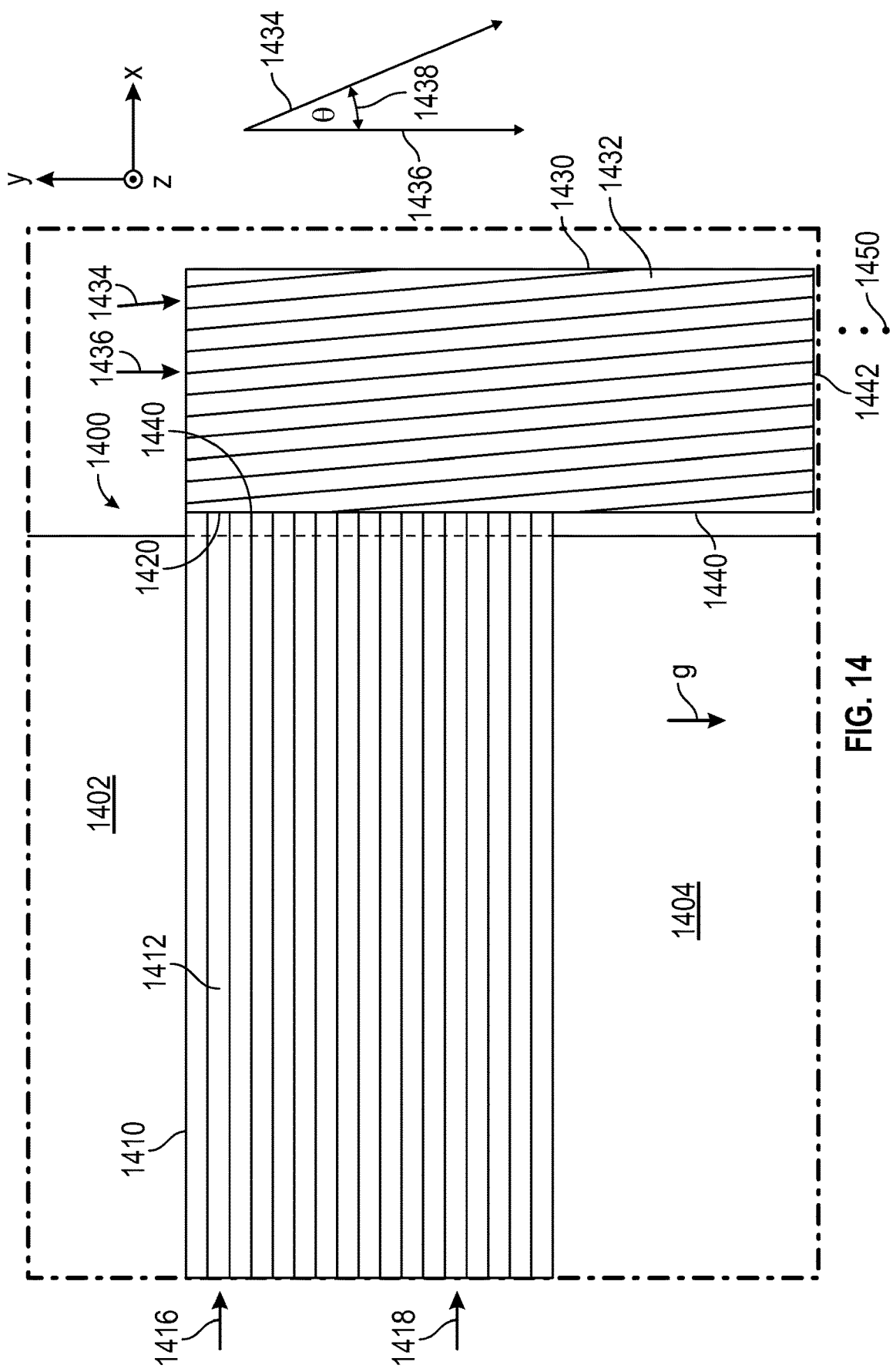
FIG. 14 illustrates a condensation management apparatus attached to a component of a refrigeration system in accordance with various embodiments.

FIG. 14 illustrates a condensation management apparatus attached to a component of a refrigeration system in accordance with various embodiments. The component of the refrigeration system illustrated in FIG. 14 includes a vertical surface 1402 comprising an opening 1404 dimensioned to receive a conveyor system (not shown). The opening 1404 can be the entrance or exit of the refrigeration system. The opening 1404 can have a width and a height equivalent to dimensions of an entrance or exit of a standard food industry freezer tunnel (e.g., a width of 2 feet and a height of 6 inches).

The condensation management apparatus 1400 illustrated in FIG. 14 includes a first fluid control film 1410 and a second fluid control film 1430. The first film 1410 includes an array of channels 1412 that extend across a length of the first film 1410. The channels 1412 have a channel longitudinal axis 1416 that is parallel with a longitudinal axis 1418 of the film 1410. The second film 1430 includes channels 1432 that are disposed at a bias angle, θ, with respect to a longitudinal axis 1436 of the second film 1430, the y-axis in FIG. 12. The channels 1432 extend across the second film 1430 along a channel longitudinal axis 1434. The longitudinal axis 1436 of the second film 1430 intersects with the channel longitudinal axis 1434 to form a channel angle 1438. The channel angle 1438 may be between 0 and 45 degrees. In some embodiments, the channel angle 1438 is less than 45 degrees. In some embodiments, the channel angle 1438 is between about 5 degrees and about 30 degrees, or about 15 degrees to about 25 degrees. In some embodiments, the channel angle 1438 is about 20 degrees.

As is shown in FIG. 14, an end edge 1420 of the first film 1410 abuts a side edge 1440 of the second film 1430. Edge openings of the channels 1410 at the end edge 1420 of the first film 1410 are adjacent and fluidically coupled to edge openings of the channels 1432 at the side edge 1440 of the second film 1430. In this arrangement, the channels 1432 of the second film 1430 are aided by downward gravitational forces creating a siphon effect. This additional capillary force exerted by the channels 1432 of the second film 1430 causes the channels 1432 to pull condensate from the channels 1412 of the first film 1410. Condensate transferred from the first film 1410 to the second film 1430 is released at an end edge 1442 of the second film 1430 in the form of droplets 1450.

Referring again to FIG. 5, and as previously discussed, the microstructured film arrangement 520 attached to the vertical surface 502 of the refrigeration system 500 transports condensate formed on the film arrangement 520 laterally to the edge of the opening 504, away from product on the conveyor system 510. The freezer tunnel shown in FIG. 5 also includes a horizontal surface 505 on which condensation forms due to the mixing of cold air internal of the refrigeration system 500 with room air near the opening 504. Various embodiments are directed to a microstructured film arrangement configured for attachment on the underside of a horizontal surface that produces condensation, such as horizontal surface 505 of the freezer tunnel shown in FIG. 5. The microstructured film is configured to transport condensate laterally from the underside of the horizontal surface 505 to a location at or near a side surface 503 of the freezer tunnel, away from product on the conveyor system 510. The microstructured film incorporates a capillary siphon arrangement configured to generate a capillary force that pulls condensate from horizontal channels of the film laterally to a condensate release location of the film.

Figure 15A:
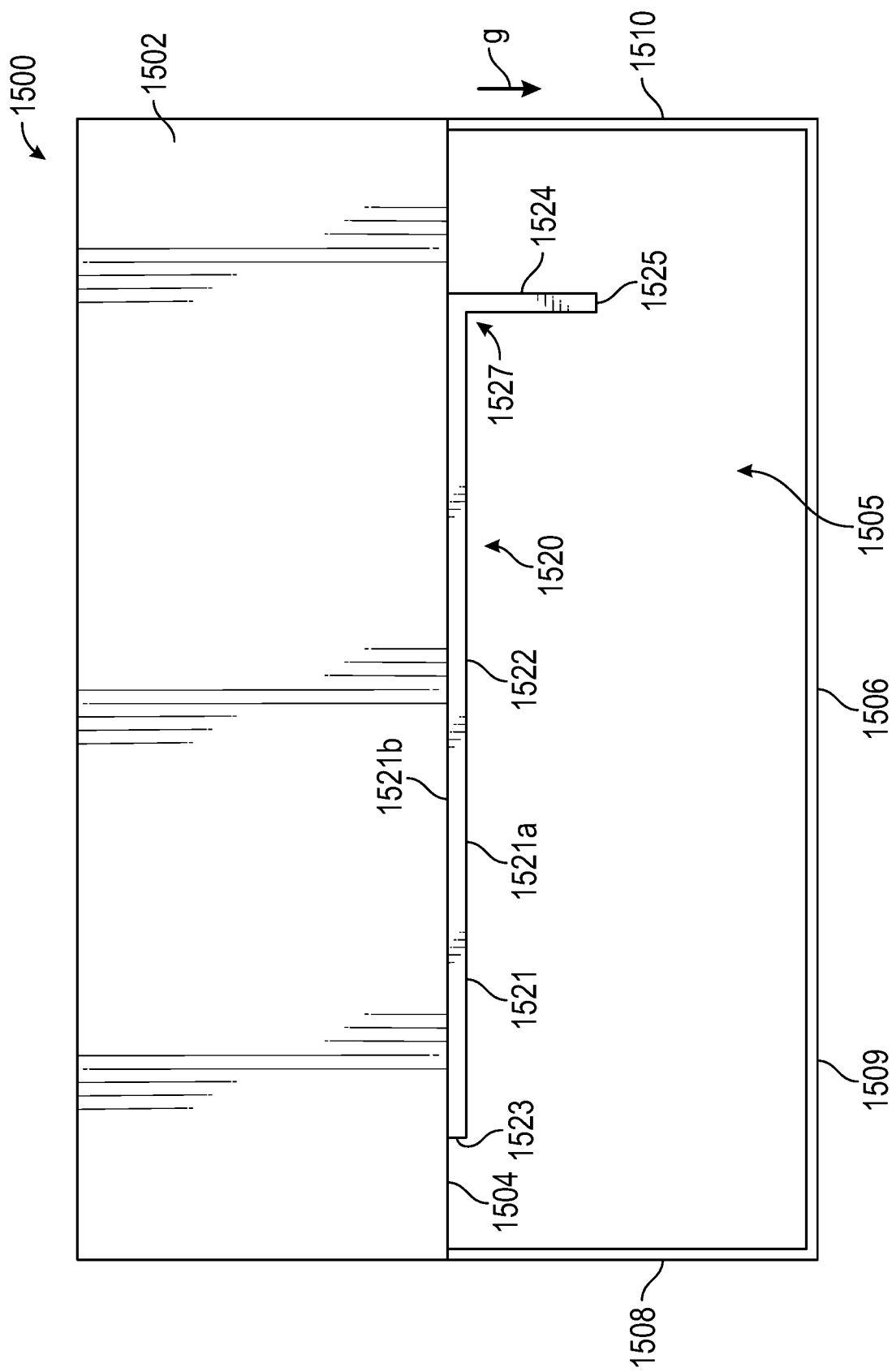
FIG. 15A is a front view of a condensation management apparatus attached to a cooling apparatus in accordance with various embodiments.
Figure 15B:
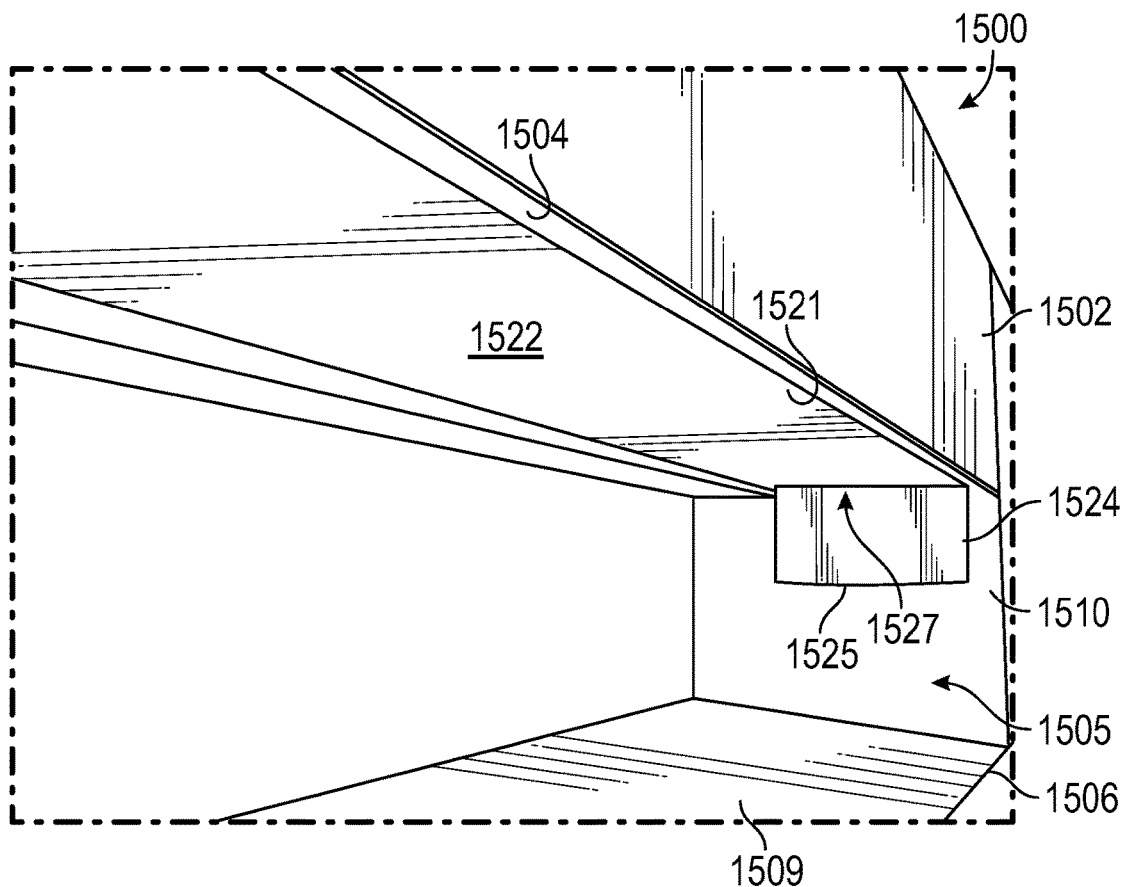
FIG. 15B is a perspective view of the condensation management apparatus and cooling apparatus illustrated in FIG. 15A.

FIG. 15A is a front view of a cooling apparatus 1500 similar to that shown in FIG. 9. FIG. 15B is a perspective view of the cooling apparatus 1500. The cooling apparatus 1500 simulates a standard food industry freezer tunnel, such as that shown in FIGS. 4 and 5. The cooling apparatus 1500 includes a container 1502 and a support structure 1506 comprising opposing sides 1508, 1510 and a base 1509. A bottom surface 1504 of the container 1502, the base 1509, and the opposing sides 1508, 1510 define a freezer tunnel having an opening 1505. With an ice/water mixture present in the container 1502, the temperature of the bottom surface 1504 of the container 1502 is lowered to 32 F, causing condensation to form on the bottom surface 1504.

A condensation management apparatus 1520 is attached to the horizontal bottom surface 1504 of the container 1502 (e.g., the upper surface of the freezer tunnel) and extends across a portion of the opening 1505. The condensation management apparatus 1520 includes a microstructured fluid control film 1521 having a first major surface 1521a and a second major surface 1521b. The first major surface 1521a includes channels dimension to support capillary movement of condensate. The channels on the first major surface 1521a are arranged as shown in FIG. 1A, such that the channels have a channel longitudinal axis substantially parallel with the longitudinal axis of the film 1521. An adhesive (e.g., a pressure sensitive adhesive) is disposed on the second major surface 1521b and in contact with the bottom surface 1504 of the container 1502. The film 1521 can have a construction consistent with that shown in FIG. 2B.

The film 1521 includes a first end 1523 and a second end 1525. The channels on the first major surface 1521a are continuous between the first end 1523 and the second end 1525. The film 1521 includes a fold 1527 located near the second end 1525. A condensate collection region 1522 is defined between the fold 1527 and the first end 1523. A siphon region 1524 is defined between the fold 1527 and the second end 1525. The second end 1525 of the film 1521 is lower along the direction of gravity than the condensate collection region 1522 (e.g., by at least 0.5 inches). The second end 1525 defines a condensate release location of the film 1521. The condensate collection region 1522, the fold 1527, and the siphon region 1524 define a capillary siphon structure of the microstructured film apparatus 1520.

Figure 15C:
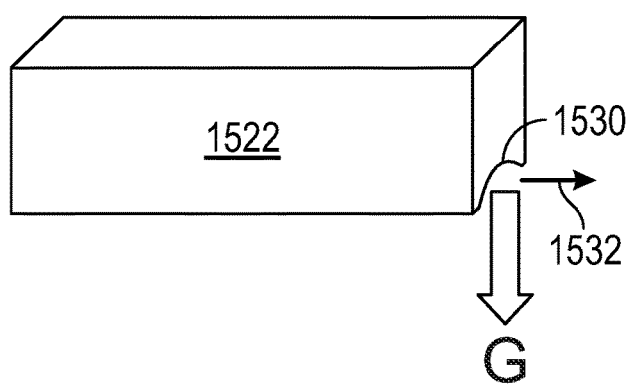
FIG. 15C illustrates longitudinal openings of fluid control film channels within a condensate collection region of the film oriented towards a direction of gravity in accordance with various embodiments.
Figure 15D:
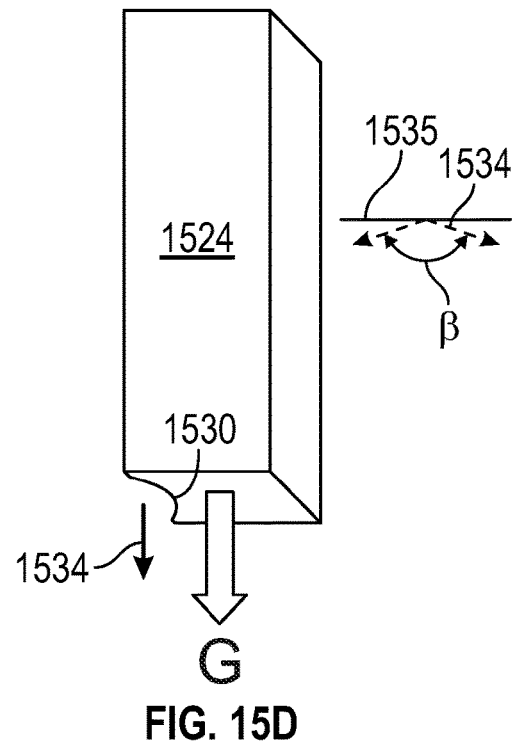
FIG. 15D illustrates a channel longitudinal axis of fluid control film channels within a siphon region of the film tilted at a tilt angle with respect to an axis normal to the direction of gravity.

As is illustrated in FIG. 15C, longitudinal openings of the channels 1530 within the condensate collection region 1522 are oriented towards a direction of gravity. A channel longitudinal axis 1532 of the channels 1530 within the condensate collection region 1522 is oriented substantially normal to the direction of gravity. As is illustrated in FIG. 15D, a channel longitudinal axis 1534 of the channels 1530 within the siphon region 1524 is tilted at a tilt angle β with respect to an axis 1535 normal to the direction of gravity. In FIG. 15D, the channel longitudinal axis 1534 is tilted at a tilt angle β of 90 degrees with respect to the axis 1535 normal to the direction of gravity. The tilt angle β can be any angle from about 5 degrees to about 175 degrees. The second end 1525 of the film 1521 should be at least 0.5 inches lower along the direction of gravity than the condensate collection region 1522. The condensate collection region 1522 can have a length of up to about 2 feet without condensate releasing from the channels 1530 in the condensate collection region 1522 in the form of droplets.

Although not shown in FIGS. 15A and 15B, the siphon region 1524 can be adhered to a plate mounted to the bottom surface 1504 of the container 1502. The plate can be oriented to achieve a desired tilt angle β. In some implementations, the siphon region 1524 can be adhered to the side 1510 of the support structure 1506.

Without being bound to a particular theory, it is hypothesized that the capillary force pulling fluid in both directions with respect to the horizontal channels 1530 is overcome by the body force of gravity pulling the fluid down over the bend in the film 1521 at the fold 1527. This effect causes a siphon phenomenon that creates void volume resulting in unidirectional transport of fluid towards the fold 1527. The film 1521 can be applied to the underside of any horizontal surface where condensation is to be managed, and is not limited to use in a freezer tunnel of a refrigeration system. The film 1521 is periodically removed from the horizontal surface, discarded, and replaced, thereby improving hygiene relative to current practices.

Figure 16A:
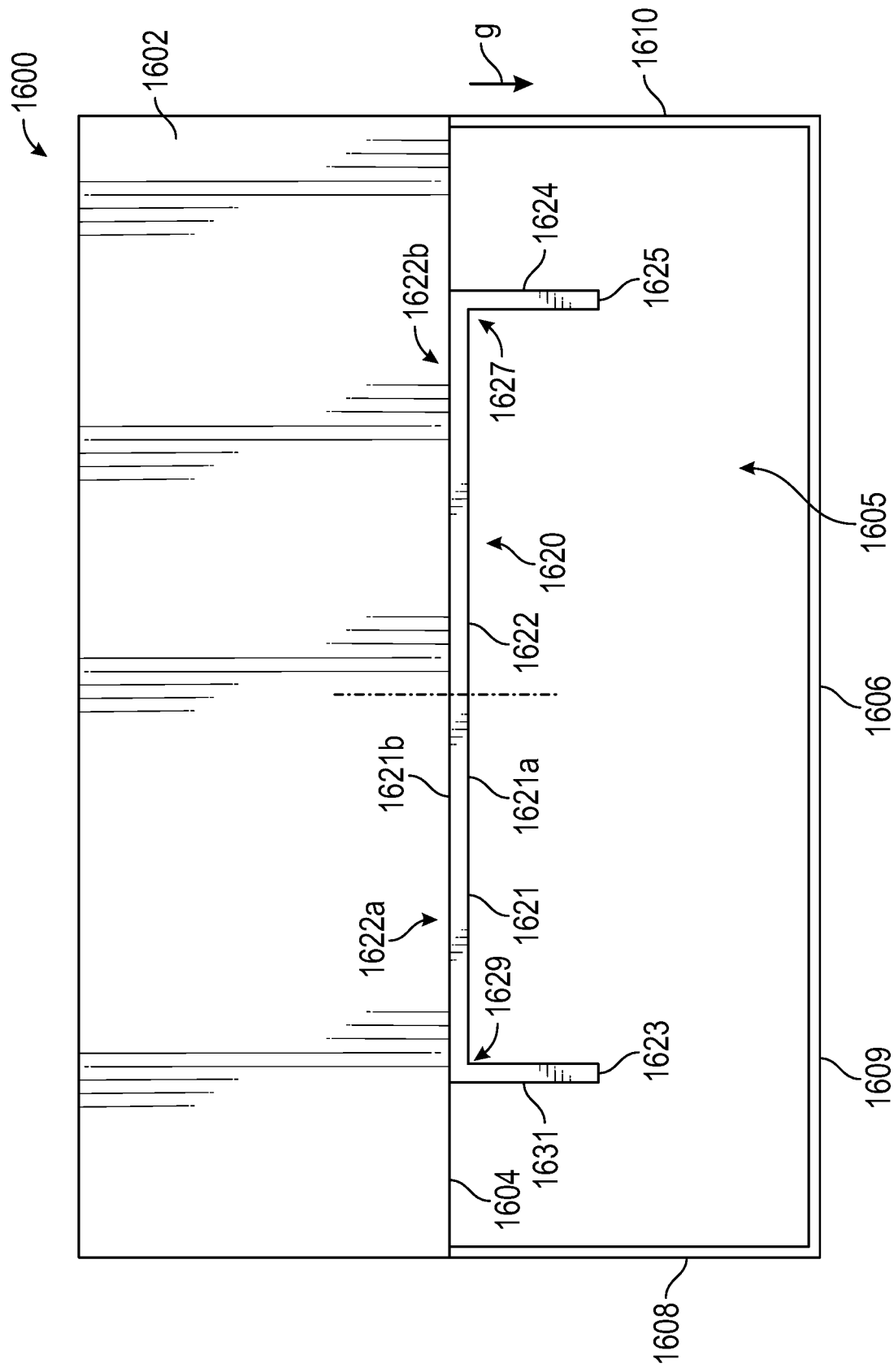
FIG. 16A is a front view of a condensation management apparatus attached to a cooling apparatus in accordance with various embodiments.
Figure 16B:
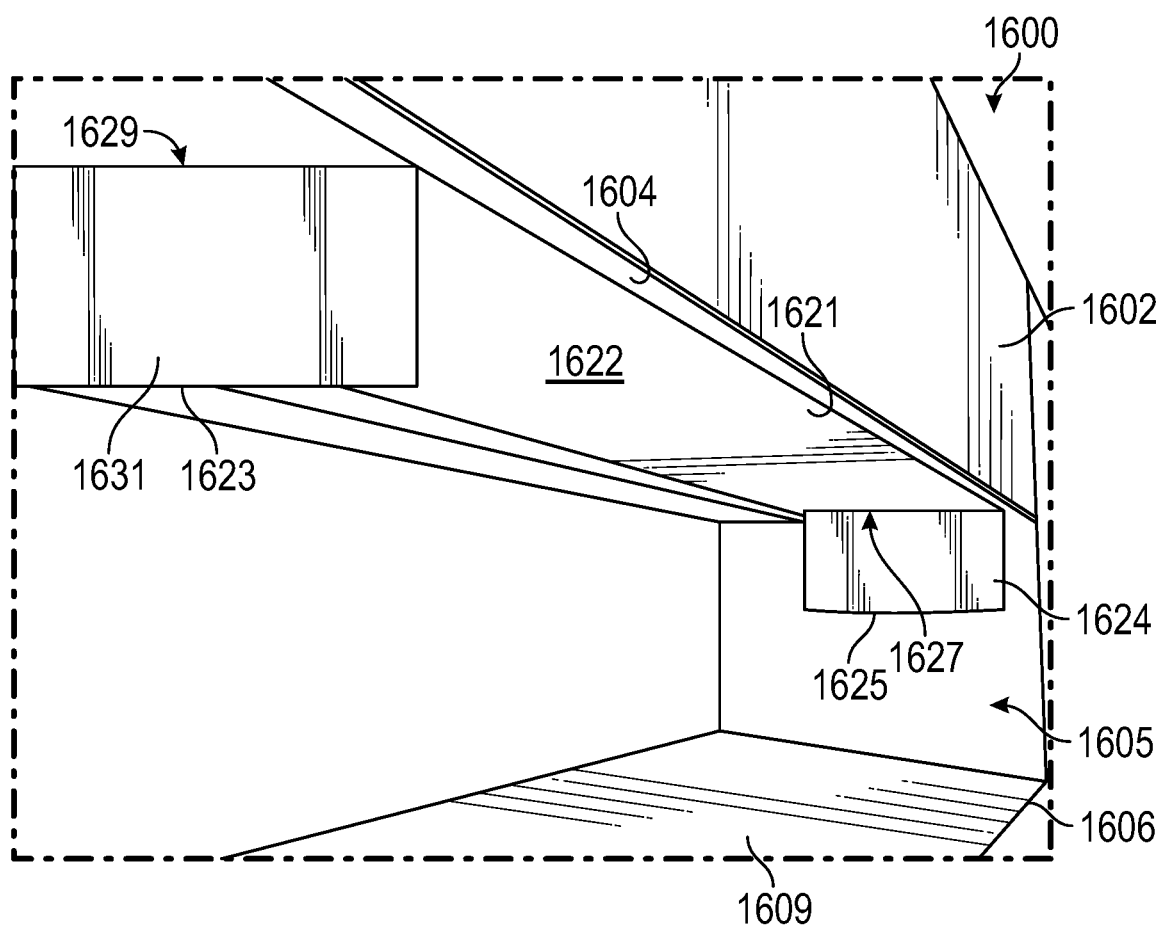
FIG. 16B is a perspective view of the condensation management apparatus and cooling apparatus illustrated in FIG. 15A.

FIG. 16A is a front view of a cooling apparatus 1600 having the same construction as that shown in FIG. 15A. FIG. 16B is a perspective view of the cooling apparatus 1600. The cooling apparatus 1600 simulates a standard food industry freezer tunnel, such as that shown in FIGS. 4 and 5. The cooling apparatus 1600 includes a container 1602 and a support structure 1606 comprising opposing sides 1608, 1610 and a base 1609. A bottom surface 1604 of the container 1602, the base 1609, and the opposing sides 1608, 1610 define a freezer tunnel having an opening 1605. With an ice/water mixture present in the container 1602, the temperature of the bottom surface 1604 of the container 1602 is lowered to 32 F, causing condensation to form on the bottom surface 1604.

A condensation management apparatus 1620 is attached to the horizontal bottom surface 1604 of the container 1602 (e.g., upper surface of the freezer tunnel) and extends across a portion of the opening 1605. The condensation management apparatus 1620 includes a microstructured fluid control film 1621 having a first major surface 1621a and a second major surface 1621b. The first major surface 1621a includes channels dimension to support capillary movement of condensate. The channels on the first major surface 1621a are arranged as shown in FIG. 1A, such that the channels have a channel longitudinal axis substantially parallel with the longitudinal axis of the film 1621. An adhesive (e.g., a pressure sensitive adhesive) is disposed on the second major surface 1621b and in contact with the bottom surface 1604 of the container 1602. The film 1621 can have a construction consistent with that shown in FIG. 2B.

The film 1621 includes a first end 1623 and a second end 1625. The channels on the first major surface 1621a are continuous between the first end 1623 and the second end 1625. The film 1621 includes a first fold 1629 located near the first end 1623. The film 1621 also includes a second fold 1627 located near the second end 1625. A condensate collection region 1622 is defined between the first fold 1629 and the second fold 1627. A first siphon region 1631 is defined between the first fold 1629 and the first end 1623. The first end 1623 of the film 1621 is lower (e.g., by at least about 0.5 inches) along the direction of gravity than the condensate collection region 1622. The first end 1623 defines a first condensate release location of the film 1621.

A second siphon region 1624 is defined between the second fold 1627 and the second end 1625. The second end 1625 of the film 1621 is lower (e.g., by at least about 0.5 inches) along the direction of gravity than the condensate collection region 1622. The second end 1625 defines a second condensate release location of the film 1621. A first half 1622a of the condensate collection region 1622, the first fold 1629, and the first siphon region 1631 define a first capillary siphon structure of the microstructured film apparatus 1620. A second half 1622b of the condensate collection region 1622, the second fold 1627, and the second siphon region 1624 define a second capillary siphon structure of the microstructured film apparatus 1620.

Consistent with the discussion of FIGS. 15C and 15D, the longitudinal openings of the channels within the condensate collection region 1622 are oriented towards a direction of gravity. A channel longitudinal axis of the channels within the condensate collection region 1622 is oriented substantially normal to the direction of gravity. The channel longitudinal axis of the channels within the first and second siphon regions 1631, 1624 is tilted at a tilt angle β with respect to an axis normal to the direction of gravity. In FIGS. 16A and 16B, the tilt angle β is 90 degrees. As was discussed previously, the tilt angle β can be any angle from about 5 degrees to about 175 degrees. With the provision of two siphon regions 1631, 1624, the condensate collection region 1622 of film 1621 can have a length of up to about 4 feet without condensate releasing from the channels within the condensate collection region 1622 in the form of droplets. The film 1621 can be applied to the underside of any horizontal surface where condensation is to be managed, and is not limited to use in a freezer tunnel of a refrigeration system. The film 1621 is periodically removed from the horizontal surface, discarded, and replaced, thereby improving hygiene relative to current practices.

Although not shown in FIGS. 16A and 16B, the siphon regions 1624, 1631 can be adhered to respective plates mounted to the bottom surface 1604 of the container 1602. The plates can be oriented to achieve a desired tilt angle (3. In some implementations, the first siphon region 1631 can be adhered to the side 1608 of the support structure 1606, and the second siphon region 1624 can be adhered to the side 1610 of the support structure 1606.

Example 3—Performance of Microstructured Film on a Horizontal Surface Having a Single Fold A cooling apparatus 1500, as illustrated in FIGS. 15A and 15B, was built from stainless steel. The cooling apparatus 1500 included a container 1502 having a length of 24 inches, a height of 6 inches, and a depth of 8 inches. The container 1502 was fabricated above a support structure 1506 having an opening 1505. The opening 1505 had a length of 24 inches, a height of 6 inches, and a depth of 8 inches. The volume of the container 1502 was filled with ice and covered with insulating foam (not shown). The ice-filled container 1502 generated a surface temperature of 32 F. The cooling apparatus 1500 was constructed to simulate the opening (entrance or exit) of a standard food industry freezer tunnel. A panel (not shown) was attached to the backside of the support structure 1506 to block the backend of the opening 1505 to help retain humidity within the opening 1505.

Preparation of Microchannel Fluid Control Film:

Film 1521, shown in FIGS. 15A and 15B, was prepared to include microchannels on one side and an adhesive on the other side. Film 1521 was prepared as described hereinabove using a tool with the pattern oriented to produce microchannels running parallel to the down web film direction (see, e.g., FIG. 1A). The microchannel surface was plasma treated followed by coating the backside with an adhesive as described hereinabove (see, e.g., FIG. 2B). More specifically, film 1521 was composed of low density polyethylene (Dow 955i LDPE) with a plasma deposited $SiO_2$-like hydrophilic coating and a CV60 natural rubber-based hot melt adhesive coated on the side opposite the microchannels.

A 4 inch wide film 1521 was applied to the bottom surface 1504 of the container 1502 as shown in FIGS. 15A and 15B. One of the ends of the film 1521 was folded onto itself at a fold location 1527 to form a pleated siphon region 1524. The pleated siphon region 1524 had a length of 3 inches. The length of the horizontal portion of the film 1521 adhered to the bottom surface 1504 of the container 1502 was 22 inches. An ice/water mixture was added to the container 1502. A humidifier tube was placed on the base 1509 of the support structure 1506 near the front of the opening 1505. The relative humidity within the simulated freezer tunnel rose from 35% to 99% and condensation began to form on the bottom surface 1504 of the container 1502.

A paper towel as well as visual inspection was used to observe whether condensation fell from any area of the film 1521 other than from the end 1525 of the pleated siphon region 1524. The film 1521 was saturated after approximately 30 minutes. Over the course of four hours, no droplets were released from any area of the film 1521 other than from the end 1525 of the pleated siphon region 1524. Additionally, any excess water that was added to the horizontal portion of the film 1521 was transported towards the pleated side of the film and released at the end 1525 of the pleated siphon region 1524.

A plastic beaker was weighed and used to collect the liquid released from the end 1525 of the pleated siphon region 1524. The beaker was weighed again following specific time course studies and the difference between before and after weights reflects the water volume accumulated. Table 3 below shows the results from this experiment.

Example 4—Performance of Microstructured Film on a Horizontal Surface Having Dual Folds A cooling apparatus 1600, as illustrated in FIGS. 16A and 16B, was built from stainless steel. The cooling apparatus 1600 included a container 1605 having a length of 24 inches, a height of 6 inches, and a depth of 8 inches. The container 1602 was fabricated above a support structure 1606 having an opening 1605. The opening 1605 had a length of 24 inches, a height of 6 inches, and a depth of 8 inches. The volume of the container 1602 was filled with ice and covered with insulating foam (not shown). The ice-filled container 1602 generated a surface temperature of 32 F. The cooling apparatus 1600 was constructed to simulate the opening (entrance or exit) of a standard food industry freezer tunnel. A panel (not shown) was attached to the backside of the support structure 1606 to block the backend of the opening 1605 to help retain humidity within the opening 1605.

Preparation of Microchannel Fluid Control Film:

Film 1621, shown in FIGS. 16A and 16B, was prepared in the same manner as film 1521 of Example 3 above.

A 4 inch wide film 1621 was applied to the bottom surface 1604 of the container 1602 as shown in FIGS. 16A and 16B. A first end of film 1621 was folded onto itself at a first fold location 1629 to form a first pleated siphon region 1631. A second end of film 1621 was folded onto itself at a second fold location 1627 to form a second pleated siphon region 1624. The pleated siphon regions 1631, 1624 had a length of 3 inches. The length of the horizontal portion of the film 1621 adhered to the bottom surface 1604 of the container 1602 was 22 inches. An ice/water mixture was added to the container 1602. A humidifier tube was placed on the base 1609 of the support structure 1606 near the front of the opening 1605. The relative humidity within the simulated freezer tunnel rose from 35% to 99% and condensation began to form on the bottom surface 1604 of the container 1602.

A paper towel as well as visual inspection was used to observe whether condensation fell from any area of the film 1621 other than from the ends 1623, 1625 of the pleated siphon regions 1631, 1624. The film 1621 was saturated after approximately 30 minutes. Over the course of four hours, no droplets were released from any area of the film 1621 other than from the ends 1623, 1625 of the pleated siphon regions 1631, 1624. Additionally, any excess water that was added to the horizontal portion of the film 1621 was transported towards the pleated sides of the film 1621 and released at the ends 1623, 1625 of the pleated siphon regions 1631, 1624.

Plastic beakers were weighed and used to collect the liquid released from the ends 1623, 1625 of the pleated siphon regions 1631, 1624. The beakers were weighed again following specific time course studies and the difference between before and after weights reflects the water volume accumulated. Table 3 below shows the results from this experiment.

TABLE 3

| Sample Information | Starting mass (g) | Ending mass (g) | Mass of water (g) | Total for all pleats (g) | Time Collected (min) |
|---|---|---|---|---|---|
| Run 1 | | | | | 90 |
| Single Pleat | 9.84 | 14.15 | 4.31 | 4.31 | |
| Double pleat 1 | 9.91 | 13.15 | 3.24 | 6.00 | |
| Double pleat 2 | 10.22 | 12.98 | 2.76 | | |
| Run 2 | | | | | 360 |
| Single Pleat | 9.84 | 24.53 | 14.69 | 14.69 | |
| Double pleat 1 | 9.91 | 24.93 | 15.02 | 25.41 | |
| Double pleat 2 | 10.23 | 20.61 | 10.39 | | |

The results in Table 3 indicate that the addition of more than one pleat over a 2-foot span of film, in the system, can increase the volume of liquid released. The difference in mass collected at 90 versus 360 minutes appears to be linear and proportional to time for each individual pleat. Therefore, it may be favorable to institute a two-pleat system to minimize total liquid held in the film and reduce the probability of premature release.

Example 5—Horizontal Transport Distance Using Siphon Regions

Figure 17A:
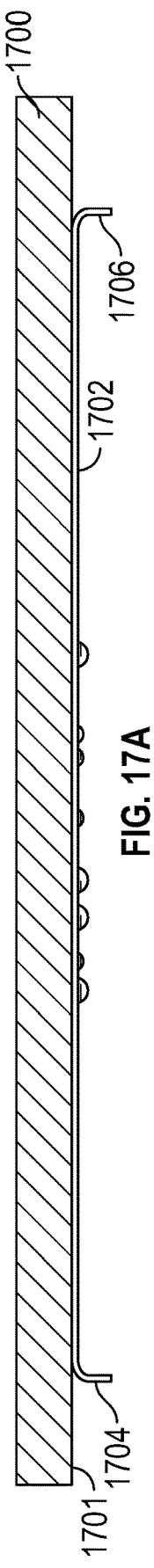
FIG. 17A illustrates a condensation management apparatus attached to an experimental cooling apparatus in accordance with various embodiments.

With reference to FIG. 17A, a 10-foot section of aluminum house gutter 1700 (McMaster Carr, part number 62415T44) was end capped (McMaster Carr part numbers 62415T29 and 62415T31) and sealed with RTV silicone caulk (CRC, Warminster Pa., Part number 14056) to prevent leaks. Gutter hangers (McMaster Carr, part number 62415T36) were placed in the top opening of the gutter 1700 approximately 18 inches apart. One-half inch aluminum rods were fastened to the gutter clamps using zip ties. The rods were attached to ring stands, suspending the gutter 1700 approximately 18 inches above the base of the stands. The base of the ring stands were placed on 8 inches by 8 inches laboratory jacks (Fisher Scientific part number S63082). The gutter assembly was placed on a table in a walk-in environmental chamber, using the laboratory jacks to level the gutter 1700 horizontally.

Microchannel film 1702 with channels oriented parallel to the edge of the film 1702 was prepared as described hereinabove (see, e.g., FIGS. 1A and 2B). A 4 inch wide, 7 foot section of the film 1702 was adhered to the underside 1701 of the gutter 1700. Siphon regions 1704, 1706 were created on each end of the film 1702 by pulling back 3 inches of film 1702. A balance was placed below each siphon region 1704, 1706 to collect condensate in an aluminum weighing dish.

Figure 17B:
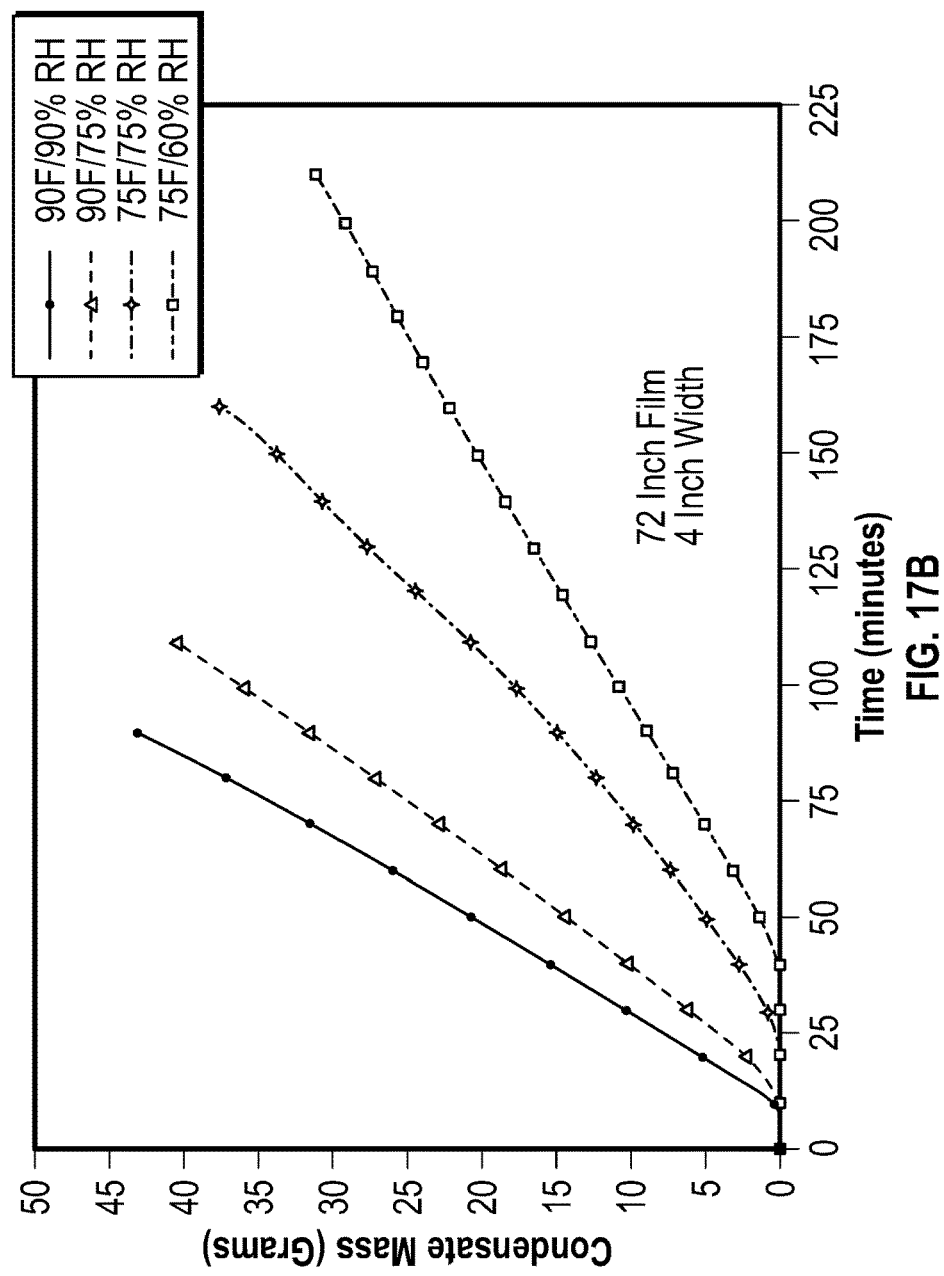
FIG. 17B is a graph of collected condensate as a function of time for an experiment conducted using the apparatus illustrated in FIG. 17.

The environmental conditions were set to the values shown in Table 4 below and allowed to equilibrate. The gutter 1700 was filled with ice. The top opening was covered with 1 inch Styrofoam insulation to minimize melting. Condensation was collected from the siphon regions 1704, 1706, recording the mass every 10 minutes. The film 1702 was monitored for hanging droplet formation and release along the length of the film 1702. After each condition, the ice was removed from the gutter 1700 and the film 1702 allowed to completely dry. The mass of condensate collected at the left siphon region 1704 is depicted in FIG. 17B. The rate of condensation collection was determined for each condition using the slope function in Excel (Microsoft Corporation) for the linear portion of each line and reported in Table 4 below.

TABLE 4

| Temperature (F.) | Relative humidity (%) | Condensate collected at siphon region (grams/hour) |
|---|---|---|
| 75 | 60 | 12.1 |
| 75 | 75 | 16.2 |
| 75 | 90 | 23.8 |
| 90 | 60 | 21 |
| 90 | 75 | 27 |
| 90 | 90 | 30.1 |

After 2 hours, the location of surface hanging droplets along the film 1702 was recorded. For each condition, droplets were observed forming in the center portion of the film 1702. Regions of the film 1702 nearest the siphon regions 1704, 1706 did not contain hanging droplets due to the lateral transport of condensation. The average distance from the siphon regions 1704, 1706 to the leading edge of the hanging droplet region was 23 inches, as is reported in Table 5 below. The film length was then shortened to provide a distance between siphon regions 1704, 1706 of 36 inches. The experiment was repeated at 90 F and 90% RH. No hanging drops were observed on the film 1702 after two hours.

TABLE 5

| Distance between siphon regions (inches) | Temperature (F.) | Relative humidity (%) | Distance from left siphon region to first hanging drop (inches) | Distance from right siphon region to first hanging drop (inches) |
|---|---|---|---|---|
| 72 | 75 | 75 | 20 | 26 |
| 72 | 75 | 90 | 22 | 25 |
| 72 | 90 | 60 | 17 | 25 |
| 72 | 90 | 75 | 23 | 27 |
| 72 | 90 | 90 | 22 | 25 |
| 36 | 90 | 90 | No drops formed | No drops formed |

Example 6—Effect of Siphon Region Length and Angle

Figure 17C:
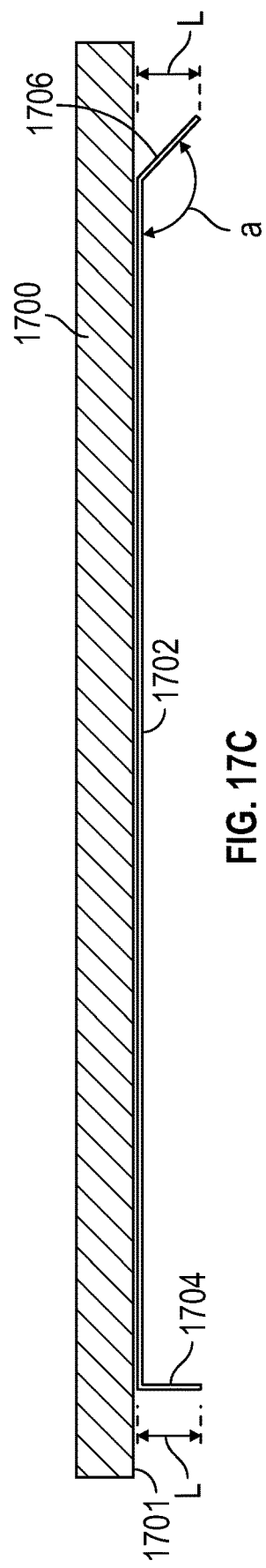
FIG. 17C illustrates a condensation management apparatus attached to an experimental cooling apparatus in accordance with various embodiments.

The gutter 1700 and film 1702 described in Example 5 above were placed on a laboratory bench at ambient conditions (72 F/25% RH) and leveled using the laboratory jacks. As shown in FIG. 17C, a first siphon region 1706 was created on one end of the film 1702 by pulling back 4.5 inches of the film 1702. The exposed adhesive side was laminated to a 4 inch by 4 inch by 0.070 inch thick stainless steel plate. Extension springs (McMaster Carr part number E9C-SS) were attached to drilled holes in the corners of the plate. The free end of the springs was attached to drilled holes in the laboratory jack plate. The springs were tensioned by pulling the laboratory jack away from the plate followed by securing the base of the jack to the laboratory bench using C-clamps. The height of the laboratory jack was adjusted for each experiment to achieve the angles (a) and distance (L) shown in Table 6 below. For the case of the −170 degree angle, the laboratory jack was reversed and pulled in the opposite direction.

A second siphon region was created on the opposite end of the film 1702 by pulling back 7 inches of the film 1702 and folding the film 1702 back on itself to create a 3.25 inch vertical pleat 1704 oriented perpendicular (90 degrees) to the gutter base 1701. The pleat 1704 was shortened for each experiment to the length shown in Table 6 below using scissors. The combination of cutting and angle adjustment kept the vertical distance from the end of the pleat 1704 to the base 1701 of the gutter 1700 the same for each trial.

The gutter 1700 was filled with ice and the top covered with 1 inch Styrofoam insulation. Water vapor generated from a commercial steam cleaner (ProPlus 300CS, Diamer Industries, Worburn Mass.) was directed towards the film 1702 using a back and forth motion until steady state dripping was observed from the siphon regions 1704, 1706 and hanging droplets were observed in the center of the film 1702 as described in Example 5 above. Hanging droplets were observed to form in the "clearing zone" near the siphon regions 1704, 1706 when the distance L was less than 0.5 inches.

TABLE 6

| Siphon angle (degrees) | Siphon length (inches) | Vertical distance from horizontal plane to end of siphon (inches) | Hanging drops formed within 18 inches of siphon point |
|---|---|---|---|
| 90 | 3.25 | | no |
| 90 | 2 | | no |
| 90 | 1 | | no |
| 90 | 0.5 | | no |
| 90 | 0.25 | | yes |

TABLE 6-continued

| Siphon angle (degrees) | Siphon length (inches) | Vertical distance from horizontal plane to end of siphon (inches) | Hanging drops formed within 18 inches of siphon point |
|---|---|---|---|
| −170 | 4.5 | 1 | no |
| 45 | 4.5 | 3.25 | no |
| 25 | 4.5 | 2 | no |
| 10 | 4.5 | 1 | no |
| 5 | 4.5 | 0.5 | no |
| 2.5 | 4.5 | 0.25 | yes |

Various embodiments are described herein including the following items.

Item 1 is a condensation management apparatus, comprising:

a microstructured film arranged to condense water vapor on an underside of a substantially horizontal surface, the microstructured film comprising:
channels disposed at least on a first major surface of the film and configured to support capillary movement of condensate, the channels having a channel axis substantially parallel with a longitudinal axis of the film; and
a capillary siphon structure comprising:
a fold in the film;
a condensate collection region proximate the fold; and
a siphon region between the fold and a condensate release location of the film; and at least a portion of a second major surface of the film attached to the underside of the substantially horizontal surface such that longitudinal openings of the channels of the condensate collection region are oriented towards a direction of gravity and the condensate release location is positioned lower along the direction of gravity than the condensate collection region to support siphon action of the capillary siphon structure.

Item 2 is the apparatus of item 1, wherein the channel axis of the siphon region is oriented at an angle of at least about 5 degrees relative to the channel axis of the condensate collection region.

Item 3 is the apparatus of item 1, wherein the channel axis of the siphon region is oriented at an angle of about 5 to about 175 degrees relative to the channel axis of the condensate collection region.

Item 4 is the apparatus of item 1, wherein the condensate collection region has a length that supports siphon action of the condensate management apparatus without dripping of condensate from the condensate collection region.

Item 5 is the apparatus of item 1, wherein the condensate collection region has a length of up to about 2 feet.

Item 6 is the apparatus of item 1, wherein the condensate release location is positioned lower along the direction of gravity than the condensate collection region by at least 0.5 inches.

Item 7 is the apparatus of item 1, comprising an adhesive on the second major surface of the film at least in the condensation collection region.

Item 8 is the apparatus of item 1, wherein the channels are continuous along the condensate collection region, the fold, and the siphon region.

Item 9 is the apparatus of item 1, wherein channels have a width of 500 µm or less.

Item 10 is a condensation management apparatus, comprising:

a microstructured film arranged to condense water vapor on an underside of a substantially horizontal surface, the microstructured film comprising:
channels disposed at least on a first major surface of the film and configured to support capillary movement of condensate, the channels having a channel axis substantially parallel with a longitudinal axis of the film; and
a plurality of capillary siphon structures comprising:
a first fold in the film;
a second fold in the film;
a condensate collection region between the first and second folds;
a first siphon region between the first fold and a first condensate release location of the film; and
a second siphon region between the second fold and a second condensate release location of the film; and at least a portion of a second major surface of the film attached to the underside of the substantially horizontal surface such that longitudinal openings of the channels of the condensate collection region are oriented towards a direction of gravity and the first and second condensate release locations are positioned lower along the direction of gravity than the condensate collection region to support siphon action of the capillary siphon structures.

Item 11 is the apparatus of item 10, wherein the channel axis of the first and second siphon regions is oriented at an angle of at least about 5 degrees relative to the channel axis of the condensate collection region.

Item 12 is the apparatus of item 10, wherein the channel axis of the first and second siphon regions is oriented at an angle of about 5 to about 175 degrees relative to the channel axis of the condensate collection region.

Item 13 is the apparatus of item 10, wherein the condensate collection region has a length that supports siphon action of the condensate management apparatus without dripping of condensate from the condensate collection region.

Item 14 is the apparatus of item 10, wherein the condensate collection region has a length of up to about 4 feet.

Item 15 is the apparatus of item 10, wherein the condensate release location is positioned lower along the direction of gravity than the first and second condensate collection regions by at least 0.5 inches.

Item 16 is the apparatus of item 10, comprising an adhesive on the second major surface of the film at least in the condensation collection region.

Item 17 is the apparatus of item 10, wherein the channels are continuous along the condensate collection region, the first and second folds, and the first and second siphon regions.

Item 18 is the apparatus of item 10, wherein channels have a width of 500 µm or less.

Item 19 is a method, comprising:
collecting, in a condensate collection region of a microstructured film comprising capillary channels, condensate produced on an underside of a substantially horizontal surface;
siphoning the condensate from the collection region across a first fold in the film and through a first siphon region of the film to a first condensate release location of the film; and
releasing the condensate from the film at the first condensate release location of the film.

Item 20 is the method of item 19, wherein the first condensate release location is lower along the direction of gravity than the condensate collection region by at least 0.5 inches.

Item 21 is the method of item 19, further comprising:
siphoning the condensate from the collection region across a second fold in the film and through a second siphon region of the film to a second condensate release location of the film; and
releasing the condensate from the film at the second condensate release location of the film.

Item 22 is the method of item 21, wherein the first and second condensate release locations are lower along the direction of gravity than the condensate collection region by at least 0.5 inches.

Item 23 is the method of item 19, wherein channels have a width of 500 μm or less.

In the forgoing description, reference is made to the accompanying set of drawings that form a part of the description hereof and in which are shown by way of illustration of several specific embodiments. It is to be understood that other embodiments are contemplated and may be made without departing from the scope of the present disclosure. The detailed description, therefore, is not to be taken in a limiting sense. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Particular materials and dimensions thereof recited in the disclosed examples, as well as other conditions and details, should not be construed to unduly limit this disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A condensation management apparatus, comprising:
    a microstructured film arranged to condense water vapor on an underside of a substantially horizontal surface, the microstructured film comprising:
        channels disposed at least on a first major surface of the film and configured to support capillary movement of condensate, the channels having a channel axis substantially parallel with a longitudinal axis of the film; and
        a capillary siphon structure comprising:
            a fold in the film;
            a condensate collection region proximate the fold; and
            a siphon region between the fold and a condensate release location of the film; and
    at least a portion of a second major surface of the film attached to the underside of the substantially horizontal surface such that longitudinal openings of the channels of the condensate collection region are oriented towards a direction of gravity and the condensate release location is positioned lower along the direction of gravity than the condensate collection region to support siphon action of the capillary siphon structure.

2. The apparatus of claim 1, wherein the channel axis of the siphon region is oriented at an angle of at least about 5 degrees relative to the channel axis of the condensate collection region.

3. The apparatus of claim 1, wherein the channel axis of the siphon region is oriented at an angle of about 5 to about 175 degrees relative to the channel axis of the condensate collection region.

4. The apparatus of claim 1, wherein the condensate collection region has a length that supports siphon action of the condensate management apparatus without dripping of condensate from the condensate collection region.

5. The apparatus of claim 1, wherein the condensate collection region has a length of up to about 2 feet.

6. The apparatus of claim 1, wherein the condensate release location is positioned lower along the direction of gravity than the condensate collection region by at least 0.5 inches.

7. The apparatus of claim 1, comprising an adhesive on the second major surface of the film at least in the condensation collection region.

8. The apparatus of claim 1, wherein the channels are continuous along the condensate collection region, the fold, and the siphon region.

9. The apparatus of claim 1, wherein the channels have a width of 500 μm or less.

10. A condensation management apparatus, comprising:
    a microstructured film arranged to condense water vapor on an underside of a substantially horizontal surface, the microstructured film comprising:
        channels disposed at least on a first major surface of the film and configured to support capillary movement of condensate, the channels having a channel axis substantially parallel with a longitudinal axis of the film; and
        a plurality of capillary siphon structures comprising:
            a first fold in the film;
            a second fold in the film;
            a condensate collection region between the first and second folds;
            a first siphon region between the first fold and a first condensate release location of the film; and
            a second siphon region between the second fold and a second condensate release location of the film; and
    at least a portion of a second major surface of the film attached to the underside of the substantially horizontal surface such that longitudinal openings of the channels of the condensate collection region are oriented towards a direction of gravity and the first and second condensate release locations are positioned lower along the direction of gravity than the condensate collection region to support siphon action of the capillary siphon structures.

11. The apparatus of claim 10, wherein the channel axis of the first and second siphon regions is oriented at an angle of at least about 5 degrees relative to the channel axis of the condensate collection region.

12. The apparatus of claim 10, wherein the channel axis of the first and second siphon regions is oriented at an angle of about 5 to about 175 degrees relative to the channel axis of the condensate collection region.

13. The apparatus of claim 10, wherein the condensate collection region has a length that supports siphon action of the condensate management apparatus without dripping of condensate from the condensate collection region.

14. The apparatus of claim 10, wherein the condensate collection region has a length of up to about 4 feet.

15. The apparatus of claim 10, wherein the condensate release location is positioned lower along the direction of gravity than the first and second condensate collection regions by at least 0.5 inches.

16. The apparatus of claim 10, comprising an adhesive on the second major surface of the film at least in the condensation collection region.

17. The apparatus of claim 10, wherein the channels are continuous along the condensate collection region, the first and second folds, and the first and second siphon regions.

18. The apparatus of claim 10, wherein the channels have a width of 500 μm or less.

\* \* \* \* \*